(12) United States Patent
Yang et al.

(10) Patent No.: US 11,759,060 B2
(45) Date of Patent: Sep. 19, 2023

(54) PORTABLE CONSUMER LIQUID PUMP

(71) Applicant: simplehuman, LLC, Torrance, CA (US)

(72) Inventors: Frank Yang, Palos Verdes Estates, CA (US); Jason Chin, Hermosa Beach, CA (US); Josef Kirkman, Palos Verdes Estates, CA (US)

(73) Assignee: simplehuman, LLC, Torrance, CA (US)

( * ) Notice: Subject to any disclaimer, the term of this patent is extended or adjusted under 35 U.S.C. 154(b) by 0 days.

(21) Appl. No.: 17/666,377

(22) Filed: Feb. 7, 2022

(65) Prior Publication Data

US 2022/0248915 A1 Aug. 11, 2022

Related U.S. Application Data

(60) Provisional application No. 63/147,096, filed on Feb. 8, 2021.

(51) Int. Cl.
*A47K 5/12* (2006.01)
(52) U.S. Cl.
CPC .......... *A47K 5/1209* (2013.01); *A47K 5/1217* (2013.01)
(58) Field of Classification Search
CPC ............... A47K 5/1209; A47K 5/1217; A47K 2005/1218; A47K 5/1201; A47K 5/1208;
(Continued)

(56) References Cited

U.S. PATENT DOCUMENTS 1,598,970 A 9/1926 Anton
1,852,821 A 4/1932 Rambo
(Continued)

FOREIGN PATENT DOCUMENTS

CA 141847 4/2012
CA 144016 4/2012
(Continued)

OTHER PUBLICATIONS

Simplehuman® Sensor Pump Max Liquid Soap or Sanitizer Dispenser, https://www.officedepot.com/a/products/8839133/simplehuman-Sensor-Pump-Max-Liquid-Soap/#Reviews, available Aug. 2021, retrieved Mar. 29, 2022, in 2 pages.
(Continued)

*Primary Examiner* — Donnell A Long
(74) *Attorney, Agent, or Firm* — Knobbe Martens Olson & Bear LLP

(57) ABSTRACT

Various liquid dispensers are disclosed. Certain embodiments include a portable liquid dispenser configured for consumer use in dispensing soap, sanitizer, or ingestible liquids. The dispenser can comprise a housing, a reservoir having an interior configured to store a liquid, a fluid pathway having an opening in fluid communication with the interior of the reservoir, a pump comprising a plurality of rollers, each of the plurality of rollers being configured to contact a portion of the fluid pathway in a flexible tube such that each of the plurality of rollers compresses a portion of the flexible tube that is in contact with the roller, a nozzle, a fluid damper in communication with the pump and the nozzle, an electronic control unit in electrical communication with the pump, and a rotation-tracking feedback system in electrical communication with the electronic control unit.

16 Claims, 17 Drawing Sheets

(58) Field of Classification Search
CPC .. A47K 5/1212; A47K 5/1215; A47K 5/1205; B05B 12/122; B05B 9/0872; B67D 1/0012; B67D 1/108; F16L 55/0338
See application file for complete search history.

(56) References Cited

U.S. PATENT DOCUMENTS

| | | |
|---|---|---|
| 2,017,867 A | 10/1935 | Nantz |
| 2,106,043 A | 1/1938 | Urquhart et al. |
| 2,294,236 A | 8/1942 | Levernier |
| 2,628,744 A | 2/1953 | Mowbray |
| 2,651,545 A | 9/1953 | Shotton |
| 2,697,446 A | 12/1954 | Harrington |
| 2,772,817 A | 12/1956 | Jauch |
| 3,023,922 A | 3/1962 | Arrington et al. |
| 3,149,754 A | 9/1964 | Kogan et al. |
| 3,159,317 A | 12/1964 | Mini |
| 3,220,954 A | 11/1965 | Malbe |
| 3,531,021 A | 9/1970 | Bassett |
| 3,631,736 A | 1/1972 | Saari |
| 3,701,482 A | 10/1972 | Sachnik |
| 4,046,289 A | 9/1977 | Teranishi |
| 4,056,050 A | 11/1977 | Brown |
| 4,113,147 A | 9/1978 | Frazier et al. |
| 4,202,387 A | 5/1980 | Upton |
| 4,217,993 A | 8/1980 | Jess et al. |
| 4,280,638 A | 7/1981 | Keihm |
| 4,457,455 A | 7/1984 | Meshberg |
| 4,498,843 A | 2/1985 | Schneider et al. |
| 4,524,805 A | 6/1985 | Hoffman |
| 4,693,854 A | 9/1987 | Yau |
| 4,722,372 A | 2/1988 | Hoffman et al. |
| 4,801,249 A | 1/1989 | Kakizawa |
| 4,915,347 A | 4/1990 | Iqbal et al. |
| 4,921,131 A | 5/1990 | Binderbauer et al. |
| 4,938,384 A | 7/1990 | Pilolla |
| 4,946,070 A | 8/1990 | Albert et al. |
| 4,967,935 A | 11/1990 | Celest |
| 5,028,328 A | 7/1991 | Long |
| 5,082,150 A | 1/1992 | Steiner et al. |
| D325,771 S | 4/1992 | Di Maggio |
| 5,105,992 A | 4/1992 | Fender et al. |
| 5,169,040 A | 12/1992 | Wiley |
| 5,186,360 A | 2/1993 | Mease et al. |
| 5,199,118 A | 4/1993 | Cole et al. |
| 5,255,822 A | 10/1993 | Mease et al. |
| 5,271,528 A | 12/1993 | Chien |
| 5,305,916 A | 4/1994 | Suzuki et al. |
| 5,381,932 A | 1/1995 | Humphrey |
| 5,449,280 A | 9/1995 | Maki et al. |
| 5,466,131 A | 11/1995 | Altham et al. |
| 5,472,719 A | 12/1995 | Favre |
| 5,477,984 A | 12/1995 | Sayama et al. |
| 5,509,578 A | 4/1996 | Livingstone |
| 5,632,414 A | 5/1997 | Merriweather, Jr. |
| 5,732,741 A * | 3/1998 | Shiery ............... F16L 55/054 138/30 |
| 5,771,925 A | 6/1998 | Lewandowski |
| 5,806,721 A | 9/1998 | Tada |
| 5,823,390 A | 10/1998 | Muderlak et al. |
| 5,829,636 A | 11/1998 | Vuong et al. |
| 5,836,482 A | 11/1998 | Ophardt et al. |
| 5,855,356 A | 1/1999 | Fait |
| 5,868,311 A | 2/1999 | Cretu-petra |
| 5,960,991 A | 10/1999 | Ophardt |
| D416,154 S | 11/1999 | Diehl |
| 5,988,451 A | 11/1999 | Hanna |
| 6,021,705 A | 2/2000 | Dijs |
| 6,021,960 A | 2/2000 | Kehat |
| 6,036,056 A | 3/2000 | Lee et al. |
| 6,048,183 A | 4/2000 | Meza |
| D426,093 S | 6/2000 | Cayouette |
| D426,413 S | 6/2000 | Kreitemier et al. |
| 6,126,290 A | 10/2000 | Veigel |
| D433,944 S | 11/2000 | Bernard |
| 6,142,340 A | 11/2000 | Watanabe et al. |
| 6,152,327 A | 11/2000 | Rhine et al. |
| D438,041 S | 2/2001 | Huang |
| 6,209,752 B1 | 4/2001 | Mitchell et al. |
| RE37,173 E | 5/2001 | Jefferson, Jr. et al. |
| 6,269,735 B1 | 8/2001 | Rolfes |
| 6,279,460 B1 | 8/2001 | Pope |
| 6,279,777 B1 | 8/2001 | Goodin et al. |
| 6,311,868 B1 | 11/2001 | Krietemeier et al. |
| 6,325,604 B1 | 12/2001 | Du |
| 6,375,038 B1 | 4/2002 | Daansen et al. |
| 6,390,329 B1 | 5/2002 | Maddox |
| 6,443,328 B1 | 9/2002 | Fehl et al. |
| 6,444,956 B1 | 9/2002 | Witcher et al. |
| D471,047 S | 3/2003 | Gordon et al. |
| 6,557,584 B1 | 5/2003 | Lucas et al. |
| 6,594,105 B1 | 7/2003 | Brittner |
| D477,956 S | 8/2003 | Grisdale et al. |
| 6,619,938 B2 | 9/2003 | Woodruff |
| D483,974 S | 12/2003 | Reed |
| D484,573 S | 12/2003 | Haug et al. |
| D486,335 S | 2/2004 | Sonneman |
| 6,698,616 B2 | 3/2004 | Hidle et al. |
| 6,722,265 B2 | 4/2004 | Priley |
| D490,262 S | 5/2004 | Graves et al. |
| 6,748,850 B1 | 6/2004 | Kraan |
| 6,777,007 B2 | 8/2004 | Cai |
| 6,805,042 B2 | 10/2004 | Mordini et al. |
| 6,824,369 B2 | 11/2004 | Raymond |
| D499,295 S | 12/2004 | Grisdale et al. |
| 6,832,542 B2 | 12/2004 | Hu et al. |
| 6,892,899 B2 | 5/2005 | Minard et al. |
| 6,929,150 B2 | 8/2005 | Muderlak et al. |
| 6,971,549 B2 | 12/2005 | Leifheit et al. |
| 6,988,897 B2 | 1/2006 | Belongia et al. |
| 7,008,073 B2 | 3/2006 | Stuhlmacher |
| D530,954 S | 10/2006 | Snell |
| D531,440 S | 11/2006 | Lo |
| D531,441 S | 11/2006 | Soriano |
| D531,845 S | 11/2006 | Christianson |
| D534,753 S | 1/2007 | Christianson |
| 7,178,746 B2 | 2/2007 | Gross |
| 7,213,593 B2 | 5/2007 | Hochrainer |
| D554,412 S | 11/2007 | Yang et al. |
| 7,296,765 B2 | 11/2007 | Rodrian |
| D560,942 S | 2/2008 | Hanna |
| D564,273 S | 3/2008 | Yang et al. |
| 7,337,635 B2 | 3/2008 | Cerruti et al. |
| D565,878 S | 4/2008 | Krus |
| 7,354,015 B2 | 4/2008 | Byrd et al. |
| D569,736 S | 5/2008 | Oates et al. |
| D581,193 S | 11/2008 | Ghiorghie |
| D582,187 S | 12/2008 | Yang et al. |
| 7,479,000 B2 | 1/2009 | Klassen |
| D593,784 S | 6/2009 | Chan |
| 7,540,397 B2 | 6/2009 | Muderlak et al. |
| D604,544 S | 11/2009 | Daams |
| 7,637,893 B2 | 12/2009 | Christensen et al. |
| D608,578 S | 1/2010 | Yang et al. |
| D610,917 S | 3/2010 | Ho |
| D622,991 S | 9/2010 | MacDonald et al. |
| 7,815,074 B2 | 10/2010 | Ciavarella et al. |
| D626,365 S | 11/2010 | Yang et al. |
| D644,523 S | 9/2011 | Howell et al. |
| D644,529 S | 9/2011 | Padain et al. |
| D644,530 S | 9/2011 | Padain et al. |
| D644,531 S | 9/2011 | Padain et al. |
| 8,087,543 B2 | 1/2012 | Yang et al. |
| 8,096,445 B2 | 1/2012 | Yang et al. |
| 8,109,301 B1 | 2/2012 | Denise |
| 8,109,411 B2 | 2/2012 | Yang et al. |
| 8,152,027 B1 | 4/2012 | Baker |
| D658,915 S | 5/2012 | Fernandes et al. |
| D659,452 S | 5/2012 | Yang et al. |
| D659,454 S | 5/2012 | Fritz et al. |
| D660,061 S | 5/2012 | Fernandes et al. |
| D661,531 S | 6/2012 | Tompkin |
| D661,933 S | 6/2012 | Delgigante et al. |
| D663,143 S | 7/2012 | Delgigante et al. |

(56) References Cited

U.S. PATENT DOCUMENTS

| | | |
|---|---|---|
| D663,983 S | 7/2012 | Yang et al. |
| D664,387 S | 7/2012 | Kennedy |
| D672,177 S | 12/2012 | Zeng |
| D674,636 S | 1/2013 | Yang et al. |
| 8,360,285 B2 | 1/2013 | Grbesic |
| D676,116 S | 2/2013 | Judd |
| D682,589 S | 5/2013 | Cheng |
| D688,488 S | 8/2013 | Wang |
| D689,299 S | 9/2013 | Kassem Llano et al. |
| D690,129 S | 9/2013 | Clough et al. |
| D690,130 S | 9/2013 | Clough et al. |
| D690,131 S | 9/2013 | Clough et al. |
| D690,530 S | 10/2013 | Clough et al. |
| 8,550,378 B2 | 10/2013 | Mazooji et al. |
| D693,597 S | 11/2013 | Yang et al. |
| D699,047 S | 2/2014 | Lissoni |
| D699,475 S | 2/2014 | Yang et al. |
| D699,574 S | 2/2014 | Cox et al. |
| 8,662,356 B2 | 3/2014 | Padain et al. |
| 8,678,244 B2 | 3/2014 | Yang et al. |
| D706,549 S | 6/2014 | Cho |
| 8,740,019 B1 | 6/2014 | Ciavarella et al. |
| D717,066 S | 11/2014 | Deacon |
| 8,893,928 B2 | 11/2014 | Proper |
| D721,279 S | 1/2015 | Van Handel et al. |
| D727,653 S | 4/2015 | Bjerre-poulsen et al. |
| D731,203 S | 6/2015 | Watson et al. |
| D731,204 S | 6/2015 | Watson et al. |
| D732,308 S | 6/2015 | Enga et al. |
| D733,454 S | 7/2015 | Von Heifner et al. |
| D746,136 S | 12/2015 | Liu |
| 9,265,383 B2 | 2/2016 | Yang et al. |
| 9,375,741 B2 | 6/2016 | Turner |
| D765,440 S | 9/2016 | Clough et al. |
| D770,798 S | 11/2016 | Yang et al. |
| D773,847 S | 12/2016 | Judd |
| D773,848 S | 12/2016 | Yang et al. |
| D785,970 S | 5/2017 | Yang et al. |
| D786,579 S | 5/2017 | Beck et al. |
| 9,763,546 B2 | 9/2017 | Yang et al. |
| D815,855 S | 4/2018 | Bos et al. |
| D818,741 S | 5/2018 | Yang et al. |
| 10,076,216 B2 | 9/2018 | Yang et al. |
| D829,465 S | 10/2018 | Yang et al. |
| D832,414 S | 10/2018 | Sharma et al. |
| 10,150,127 B2 | 12/2018 | Tepas et al. |
| D842,121 S | 3/2019 | Lee |
| D854,134 S | 7/2019 | Jessup |
| D876,955 S | 3/2020 | Atalay |
| 10,588,467 B2 | 3/2020 | Yang et al. |
| D881,367 S | 4/2020 | Kihm et al. |
| D882,056 S | 4/2020 | Baillie et al. |
| D884,480 S | 5/2020 | Karekar |
| D897,721 S | 10/2020 | Jia |
| 10,806,305 B2 | 10/2020 | Yang et al. |
| D906,723 S | 1/2021 | Chen |
| D916,262 S | 4/2021 | Wang et al. |
| D916,499 S | 4/2021 | Chen |
| 11,064,846 B2 | 7/2021 | Yang et al. |
| 11,141,026 B2 | 10/2021 | Yang et al. |
| D936,196 S | 11/2021 | Xu |
| D962,672 S | 9/2022 | Yang et al. |
| D967,650 S | 10/2022 | Yang et al. |
| 11,607,088 B2 | 3/2023 | Yang et al. |
| 2002/0179643 A1 | 12/2002 | Knight et al. |
| 2002/0185002 A1 | 12/2002 | Herrmann |
| 2003/0068242 A1 | 4/2003 | Yamakawa |
| 2004/0032749 A1 | 2/2004 | Schindler et al. |
| 2004/0050875 A1 | 3/2004 | Kobayashi |
| 2004/0077187 A1 | 4/2004 | Belongia et al. |
| 2004/0103792 A1 | 6/2004 | Cirigliano et al. |
| 2004/0134924 A1 | 7/2004 | Hansen et al. |
| 2004/0226962 A1 | 11/2004 | Mazursky et al. |
| 2005/0006407 A1 | 1/2005 | Lawson et al. |
| 2005/0127099 A1* | 6/2005 | Chou .................. A47K 5/1217 222/135 |
| 2005/0139612 A1 | 6/2005 | Matthews et al. |
| 2005/0279783 A1 | 12/2005 | Lo |
| 2006/0067546 A1 | 3/2006 | Lewis et al. |
| 2006/0086760 A1 | 4/2006 | Cohen et al. |
| 2006/0173576 A1 | 8/2006 | Goerg et al. |
| 2006/0243740 A1 | 11/2006 | Reynolds et al. |
| 2007/0000941 A1 | 1/2007 | Hadden et al. |
| 2007/0138202 A1 | 6/2007 | Evers |
| 2007/0138208 A1 | 6/2007 | Scholz et al. |
| 2007/0158359 A1 | 7/2007 | Rodrian |
| 2007/0274853 A1 | 11/2007 | Merendeiro et al. |
| 2008/0149669 A1 | 6/2008 | Nicholson et al. |
| 2008/0277411 A1 | 11/2008 | Beland et al. |
| 2008/0277421 A1* | 11/2008 | Zlatic .................. B01F 23/2351 222/383.2 |
| 2008/0283556 A1 | 11/2008 | Snodgrass |
| 2009/0026225 A1 | 1/2009 | Lickstein |
| 2009/0088836 A1 | 4/2009 | Bishop et al. |
| 2009/0140004 A1* | 6/2009 | Scorgie ................ A47K 5/1217 222/638 |
| 2009/0184134 A1 | 7/2009 | Ciavarella et al. |
| 2009/0200340 A1 | 8/2009 | Ophardt et al. |
| 2010/0031982 A1 | 2/2010 | Hornsby et al. |
| 2010/0051642 A1 | 3/2010 | Wong et al. |
| 2010/0282772 A1 | 11/2010 | Ionidis |
| 2010/0320227 A1 | 12/2010 | Reynolds |
| 2011/0017769 A1 | 1/2011 | Ophardt |
| 2011/0114669 A1 | 5/2011 | Yang et al. |
| 2011/0253744 A1 | 10/2011 | Pelfrey |
| 2011/0272432 A1 | 11/2011 | Baughman |
| 2011/0303695 A1 | 12/2011 | Fern |
| 2012/0097711 A1 | 4/2012 | Xianzhi et al. |
| 2012/0111895 A1 | 5/2012 | Fitzpatrick et al. |
| 2012/0138632 A1 | 6/2012 | Li et al. |
| 2012/0138637 A1 | 6/2012 | Ciavarella et al. |
| 2012/0248149 A1* | 10/2012 | Pelfrey ................ B05B 9/0872 222/189.1 |
| 2012/0285992 A1 | 11/2012 | Ciavarella et al. |
| 2012/0318820 A1* | 12/2012 | Amsel .................. A47K 5/1217 222/144.5 |
| 2013/0119083 A1 | 5/2013 | Ophardt et al. |
| 2013/0140323 A1 | 6/2013 | Yun et al. |
| 2013/0200109 A1 | 8/2013 | Yang et al. |
| 2013/0214011 A1 | 8/2013 | Vandekerchkhove et al. |
| 2014/0103072 A1 | 4/2014 | Pelfrey |
| 2014/0137982 A1 | 5/2014 | Nicholls et al. |
| 2014/0231450 A1 | 8/2014 | Rosko et al. |
| 2015/0265106 A1* | 9/2015 | Rospierski ............ F16K 23/00 222/129 |
| 2017/0015541 A1 | 1/2017 | Vulpitta et al. |
| 2017/0113237 A1 | 4/2017 | Scott et al. |
| 2021/0378459 A1 | 12/2021 | Yang et al. |
| 2022/0133095 A1 | 5/2022 | Yang et al. |
| 2022/0248914 A1 | 8/2022 | Yang et al. |

FOREIGN PATENT DOCUMENTS

| | | |
|---|---|---|
| CN | 1285899 A | 2/2001 |
| CN | 101606828 A | 12/2009 |
| CN | 102058336 A | 5/2011 |
| CN | 306917043 | 11/2021 |
| DE | 3718967 A1 | 12/1987 |
| DE | 3718967 C2 | 5/1994 |
| DE | 19927230 A1 | 12/2000 |
| EP | 0455431 A1 | 11/1991 |
| EP | 0493865 A1 | 7/1992 |
| EP | 2135538 A1 | 12/2009 |
| EP | 2322068 A2 | 5/2011 |
| EP | 2546523 A2 | 1/2013 |
| EP | 2738387 A1 | 6/2014 |
| EP | 008517734-0001 | 4/2021 |
| GB | 9004350817-0001 | 9/2017 |
| JP | H07-23876 | 1/1995 |
| JP | D1117308 | 6/2001 |
| JP | 2002-130153 A | 5/2002 |
| JP | D1266683 | 2/2006 |

(56) References Cited

FOREIGN PATENT DOCUMENTS

| JP | 2013-133754 A | 7/2013 |
|---|---|---|
| KR | 3002845520000 | 11/2001 |
| WO | WO 2008/095187 | 8/2008 |
| WO | WO 2008/103300 A2 | 8/2008 |
| WO | WO 2012/122056 | 9/2012 |
| WO | WO 2012/154642 A1 | 11/2012 |
| WO | WO 2013/119642 A1 | 8/2013 |
| WO | WO 2013/119874 A1 | 8/2013 |

OTHER PUBLICATIONS

Simplehuman Pulse Pump Brushed Stainless Steel 10 oz. Capacity Freestanding Soap and Lotion Dispenser, available in lowes.com, customer review oldest date Mar. 24, 2021, retrieved on Mar. 24, 2022, https://www.lowes.com/pd/simplehuman-simplehuman-10-oz-Pulse-Pump-Brushed-Stainless, in 7 pages.

North Ridge Pumps: "Pulsation Dampeners", (Aug. 30, 2019), pp. 1-3, XP055930151, Retrieved from the Internet: URL: https://www.northridgepumps.com/article-19_pulsation-dampeners [retrieved on Jun. 10, 2022].

Extended European Search Report for European Application No. 22155611.1, dated Jun. 23, 2022, 8 pages.

U.S. Appl. No. 29/756,158, filed Aug. 26, 2020, Yang et al.

U.S. Appl. No. 29/747,947, filed Aug. 26, 2020, Yang et al.

U.S. Appl. No. 17/665,377, filed Feb. 4, 2022, Yang et al.

Manring et al., "The Theoretical Flow Ripple of an External Gear Pump," Transactions of the ASME, vol. 125, Sep. 2003, pp. 396-404.

The Sharper Image Soap Genie SI335, Mar. 2006, in 8 pages.

Simplehuman® Rechargeable Sensor Soap Dispenser, Item No. 201881, https://www.sharperimage.com/si/view/product/Rechargeable-Sensor-Soap-Dispenser/201881?trail, published on Sep. 3, 2013, in 3 pages.

Blacoh University Distributor Series, YouTube.com, Pulsation Dampeners for Peristaltic & Hose Pumps, Apr. 6, 2014 https://www.youtube.com/watch?v=G-oplbhldN8, entire video (7 pages of screenshots attached).

* cited by examiner

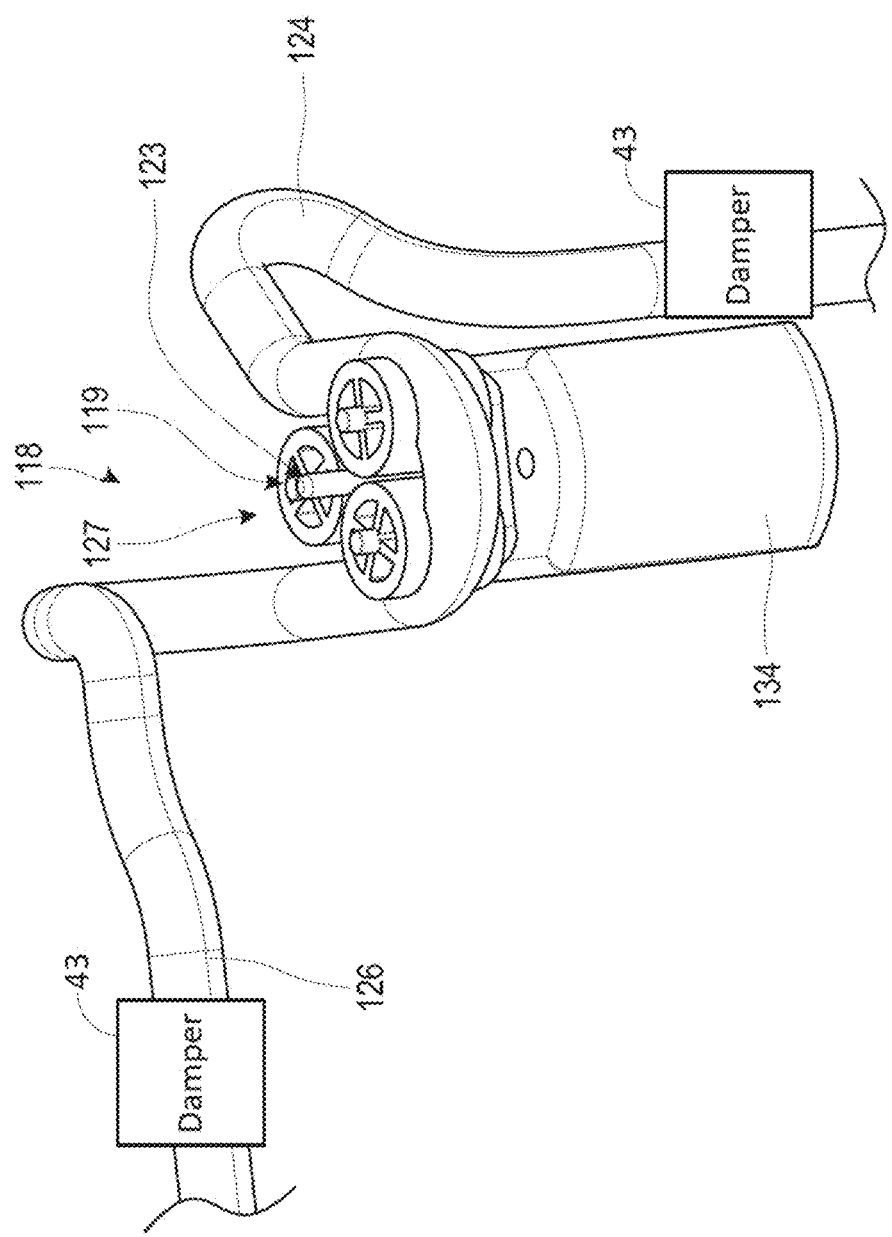

PORTABLE CONSUMER LIQUID PUMP

INCORPORATION BY REFERENCE TO ANY PRIORITY APPLICATIONS

The present application claims the benefit under 35 U.S.C. § 119(e) to U.S. Patent Application No. 63/147,096, filed on Feb. 8, 2021. The contents of each of these priority applications are hereby incorporated by reference herein in their entirety as if fully set forth herein for all purposes. Any and all applications for which a foreign or domestic priority claim is identified in the Application Data Sheet as filed with the present application are hereby incorporated by reference herein in their entirety and made a part of this specification.

BACKGROUND

Field

The present disclosure relates generally to liquid dispensers for dispensing liquids for consumer use, and specifically to electronically controlled liquid dispensers.

Description of Certain Related Art

People around the world routinely use various consumer liquids in their daily lives for many purposes, such as to wash, to sanitize, to cook or otherwise to provide food items, and to provide comfort, health, or medical benefits. In many situations, the dispensing or provision of these liquids occurs slowly, inefficiently, and with mess and risk of spreading contagion, microbes, bacteria, and other undesirable contaminants.

SUMMARY OF CERTAIN FEATURES

Various liquid dispensers are disclosed. Any liquid dispenser can include a housing and a reservoir configured to store and to dispense any liquid, such as a consumer liquid. For example, any consumer liquid can include any liquid used by consumers, such as one or more soaps, sanitizers, lotions, and/or ingestible liquids. In some implementations, ingestible liquids can include any beverage (e.g., water, juice, milk, punch, soda, smoothies, coffee, tea, energy drinks, alcohol or any alcoholic beverage, protein drinks, etc.), any condiment (e.g. ketchup, mustard, sour cream, mayonnaise, salsa, hot sauce, gravy, soy sauce, etc.), any cooking ingredient (e.g., oil, vinegar, etc.), any other food item (e.g., soup, ice cream, whipped cream, caramel, chocolate, etc.), and/or any medical, biologic, pharmaceutical, nutraceutical, or other therapeutic fluid.

In some implementations, the liquid dispenser can include a pump, a fluid passageway, and a nozzle. The pump can encourage the liquid to flow along the fluid passageway from the reservoir to the nozzle for discharge to a user. In several embodiments, the pump can be a peristaltic pump. In some embodiments, this allows the pump to be located near a top of the dispenser and/or near the nozzle. For example, the relatively high differential pressure of the peristaltic pump (compared to, for example, certain gear pumps) can enable the pump to pull the liquid upward against the flow of gravity on the upstream side of the pump. Having the pump near the top of the dispenser can put the pump in a location that is convenient for manufacturing or service, that is protected, and/or that enables a rapid dispensation of liquid. In some embodiments, the pump can facilitate an accurate dispensation volume. For example, the pump can drive discrete and known volumes of the liquid. In some embodiments, such discrete and known volumes of the liquid are the volumes between occlusions in the peristaltic pump.

A portable liquid dispenser can be configured for consumer use in dispensing soap, sanitizer, or ingestible liquids. The dispenser can comprise a housing; a reservoir configured to store a liquid; a fluid pathway included at least in part in a flexible tube disposed in the housing, wherein the flexible tube has an inlet and an outlet; a peristaltic pump disposed in the housing; a motor disposed in the housing, wherein the motor is configured to drive the pump configured to cause the liquid to move through the flexible tube; a fluid flow damper in fluid communication with the fluid pathway and the pump; a proximity sensor configured to generate an electrical signal; and an electronic processor configured to receive the signal from the proximity sensor to control the motor to dispense the liquid.

A portable liquid dispenser can be configured for consumer use in dispensing soap, sanitizer, or ingestible liquids. The dispenser can comprise a housing; a reservoir having an interior configured to store a liquid; a fluid pathway having an opening in fluid communication with the interior of the reservoir; a pump comprising a plurality of rollers, each of the plurality of rollers being configured to contact a portion of the fluid pathway in a flexible tube such that each of the plurality of rollers compresses a portion of the flexible tube that is in contact with the roller; an electronic control unit in electrical communication with the pump; and a rotation-tracking feedback system in electrical communication with the electronic control unit.

According to some embodiments, a liquid dispenser comprises a housing; a reservoir configured to store a liquid, such as a consumer liquid; a flexible tube disposed in the housing, a pump disposed in the housing; and a motor disposed in the housing. Some embodiments have a first sensor configured to generate an electrical signal based on a distance between an object and the first sensor; and an electronic processor configured to receive the signal from the first sensor. In some embodiments, the processor is configured to determine a dispensation volume of the liquid. The flexible tube can include an inlet and an outlet. The pump can include a rotor including a plurality of rollers, wherein the rotor has a rotor rotational axis, wherein each of the plurality of rollers has a roller rotational axis, and wherein the plurality of rollers is configured to rotate about the rotor rotational axis and the roller rotational axis. The motor can be configured to drive the pump configured to cause the liquid to move through the flexible tube.

In some embodiments, the pump is positioned closer to a top of the housing than a bottom of the housing. In some embodiments, the dispenser further comprises a nozzle configured to allow the liquid to be dispensed. In some embodiments, the pump is positioned adjacent a plane extending generally perpendicular to a vertical axis of the nozzle.

In some embodiments, a length of the flexible tube that is downstream of the pump is less than a length of the flexible tube that is upstream of the pump. In some embodiments, when the reservoir is substantially full of liquid, a volume of the liquid in the flexible tube downstream of the pump is less than a volume of the liquid in the flexible tube upstream of the pump.

In some embodiments, the plurality of rollers includes at least three rollers. In some embodiments, each of the plurality of rollers is configured to sequentially contact the flexible tube such that each of the plurality of rollers compresses a portion of the flexible tube that is in contact with the roller. In some embodiments, the flexible tube extends from the reservoir to the nozzle and passes through the pump. In some embodiments, the pump is a peristaltic pump. In some embodiments, the electronic processor is configured to send the signal to the motor by generating a first signal to dispense a first volume of fluid.

In some embodiments, the dispenser comprises a motor disposed in the housing, wherein the motor is configured to drive the pump configured to cause a liquid to move through the flexible tube. In some embodiments, the flexible tube is configured to create a seal between the liquid from the pump such that the liquid does not contact the pump. In some embodiments, the reservoir is in an empty state when an insufficient amount of liquid is disposed within the reservoir and the reservoir is in a full state when a sufficient amount of liquid is disposed within the reservoir, and wherein when the reservoir transitions from an empty state to a full state, at least a portion of the liquid moves into an opening in the flexible tube.

In some embodiments, the number of revolutions of each of the plurality of rollers about a rotational axis corresponds to a volume of liquid that is dispensed. In some embodiments, the portion of the flexible tube that is in contact with the roller remains compressed when no liquid is dispensed.

Disclosed herein are embodiments of a portable liquid dispenser configured for consumer use in dispensing soap, sanitizer, or ingestible liquids. In some embodiments, the dispenser can include a housing, a reservoir configured to store a liquid, a fluid pathway included at least in part in a flexible tube disposed in the housing, wherein the flexible tube has an inlet and an outlet, a pump disposed in the housing, a motor disposed in the housing, a fluid flow damper in fluid communication with the fluid pathway and the pump, a sensor configured to generate an electrical signal, and an electronic processor configured to receive the signal from the sensor to control the motor to dispense the liquid. In some embodiments, the motor can be configured to drive the pump configured to cause the liquid to move through the flexible tube. In some embodiments, the pump can include a rotor including a plurality of rollers, wherein the rotor has a rotor rotational axis, wherein each of the plurality of rollers can have a roller rotational axis, and wherein the plurality of rollers can be configured to rotate about the rotor rotational axis and the roller rotational axis.

Any embodiments of the manually operated dispenser or methods of using same disclosed herein can include, in additional embodiments, one or more of the following steps, features, components, and/or details, in any combination with any of the other steps, features, components, and/or details of any other embodiments disclosed herein: further comprising a second damper; further comprising a nozzle configured to allow the liquid to be dispensed; wherein the damper can be positioned in a fluid pathway between the pump and the nozzle; wherein the damper can be positioned in a fluid pathway between the reservoir and the pump; wherein the damper can include a membrane; wherein the damper can include entrapped air; wherein the damper helps to produce a substantially even flow of liquid; and/or wherein the damper helps to produce an uninterrupted flow of liquid.

Disclosed herein are embodiments of a portable liquid dispenser configured for consumer use in dispensing soap, sanitizer, or ingestible liquids. In some embodiments, the dispenser can include a housing, a reservoir having an interior configured to store a liquid, a fluid pathway having an opening in fluid communication with the interior of the reservoir, a pump, an electronic control unit in electrical communication with the pump, and a rotation-tracking feedback system in electrical communication with the electronic control unit. In some embodiments, the pump can include a plurality of rollers, each of the plurality of rollers being configured to contact a portion of the fluid pathway in a flexible tube such that each of the plurality of rollers compresses a portion of the flexible tube that is in contact with the roller.

Any embodiments of the manually operated dispenser or methods of using same disclosed herein can include, in additional embodiments, one or more of the following steps, features, components, and/or details, in any combination with any of the other steps, features, components, and/or details of any other embodiments disclosed herein; wherein the rotation-tracking feedback system can include a magnetic sensor that produces an electrical signal; wherein the magnetic sensor can be configured to measure a magnetic field emitted by a magnet on at least one of the rollers; wherein the electronic control unit can be configured to use the electrical signal from the magnetic sensor to measure the amount of rotation of the rollers; wherein the electronic control unit can be configured to use the amount of rotation of the rollers to estimate the volume of liquid dispensed; and/or wherein the electronic control unit can be configured to use the volume of liquid dispensed to control the operation of the pump.

For purposes of summarizing the disclosure, certain aspects, advantages and features have been described. Not necessarily any or all such advantages will be achieved in accordance with any or all of the particular embodiments disclosed herein. Neither this Summary, nor the following Detailed Description, nor the accompanying figures are intended to be limiting.

BRIEF DESCRIPTION OF THE DRAWINGS

Certain features, aspects, and advantages of the subject matter disclosed herein are described below with reference to the drawings, which are intended to illustrate and not to limit the scope of the disclosure. Various features of different disclosed embodiments can be combined to form additional embodiments, which are part of this disclosure. No structures, features, steps, or processes are essential or critical; any can be omitted in certain embodiments. The drawings comprise the following figures:

FIG. 12A illustrates the embodiment of the pump of FIG. 12 with the addition of dampers in the fluid pathway.

DETAILED DESCRIPTION OF CERTAIN EMBODIMENTS

Figure 1:
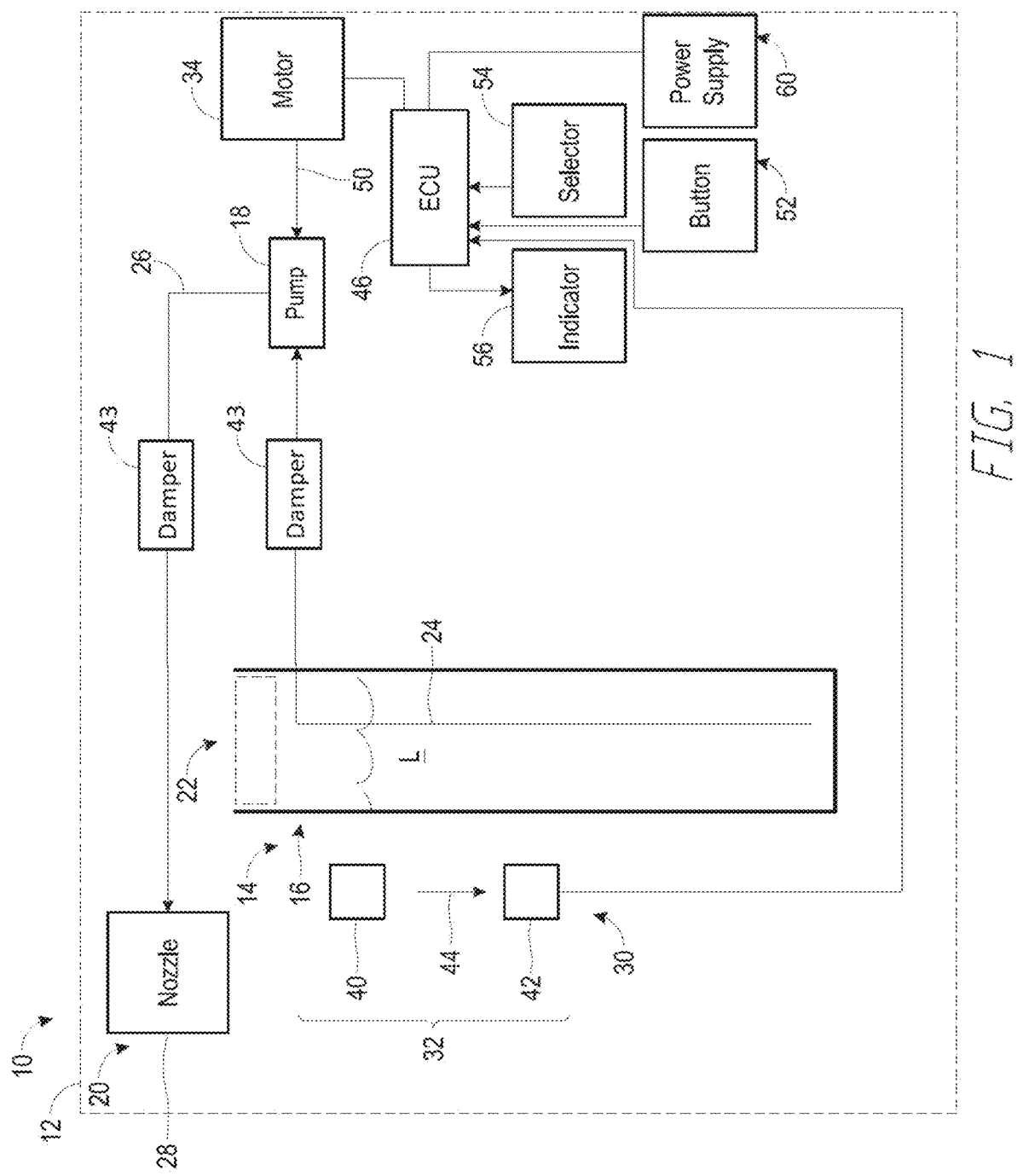
FIG. 1 schematically illustrates an electronic, automatically actuating liquid dispenser.

This specification provides textual descriptions and illustrations of many devices, components, assemblies, and subassemblies. Incorporated herein by reference for all that they disclose are the full text and drawings of U.S. Pat. No. 10,806,305. Any structure, material, function, method, or step that is described and/or illustrated in one example of this specification (including any and all material incorporated by reference) can be used by itself or with or instead of any structure, material, function, method or step that is described and/or illustrated in another example or used in this field. The text and drawings merely provide examples and should not be interpreted as limiting or exclusive. No feature disclosed in this application is considered critical or indispensable. The relative sizes and proportions of the components illustrated in the drawings form part of the supporting disclosure of this specification, but should not be considered to limit any claim unless recited in such claim.

All embodiments disclosed in this specification illustrate and/or describe features that can be used with the liquid dispenser 10 in FIG. 1. It is contemplated that any combination of features from any embodiment or multiple embodiments in this specification can be used with the liquid dispenser 10 illustrated in FIG. 1. All other embodiments in this specification are examples of the schematic system illustrated in FIG. 1, although no other embodiment is required to include every feature shown in and/or described in connection with FIG. 1.

FIG. 1 schematically illustrates a liquid dispenser 10. Any embodiment in this specification can include any feature or combination of features illustrated in FIG. 1. The dispenser 10 can include a housing 12, which can take any shape. In some embodiments, the housing 12 can at least partially contain a liquid handling system 14. The liquid handling system 14 can include a reservoir 16, one or more fluid flow dampers 43, a pump 18, and a discharger, such as a discharge assembly 20.

The reservoir 16 can be any type of container. In the illustrated embodiment, the reservoir 16 can be configured to contain a volume of liquid, such as any type of consumer liquid, including but not limited to any of those mentioned in the Summary. In some embodiments, the reservoir 16 can include a lid 22 configured to form a seal at the top of the reservoir 16 for maintaining the liquid L within the reservoir 16. In some embodiments, the lid 22 can include an air vent (not shown), which can allow air to enter the reservoir 16 as the level of liquid L falls within the reservoir 16. In some embodiments, the reservoir 16 is connected to the pump 18 by a tube 24. Any type or diameter of tube 24 can be used.

In some embodiments, the tube 24 can comprise plastic, metal, and/or rubber, among other materials.

The tube 24 can be at least partially positioned within the reservoir 16. In some embodiments, the tube 24 can be connected with the reservoir 16 through the outlet 24 at an upper end and/or a mid-section of the reservoir 16.

In some embodiments, the pump 18 can be disposed above the outlet 24 of the reservoir 16. In some embodiments, the pump 18 is aligned with the outlet 24 of the reservoir 16. For example, the pump 18 can be positioned adjacent and/or at least partially adjacent the outlet 24 of the reservoir 16. In some embodiments, the pump 18 is automatically primped due to a compression force caused by the pump 18 on the tube 24, thereby drawing liquid L into the pump 18 from the reservoir 16. The pump 18 can be connected to the discharge system 20 with a conduit 26. Any type or diameter of conduit can be used.

As shown, one or more dampers 43 can be provided or included in communication with the fluid pathway of the liquid at any suitable location or locations to help substantially or generally equalize fluid pressure within the fluid pathway and/or to provide a substantially or generally even, continuous, smooth, and/or uninterrupted flow of fluid. In some embodiments, the fluid pathway can be included at least in part within an interior region of the tube 124. In some embodiments, as illustrated, a damper 43 can be provided or included in communication with a fluid pathway between the reservoir 16 and the pump 18, and/or between the pump 18 and the discharge assembly 20.

The discharge assembly 20 can include a discharge nozzle 28, such as a flap-type nozzle as described in further detail below. The size and configuration of the discharge nozzle 28 can be determined to provide the appropriate flow rate and/or resistance against flow of liquid L from the pump 18. In some embodiments, the nozzle 28 can be disposed at a location spaced from the lower portion of the housing 12 so as to make it more convenient for a user to place their hand or other body part under the nozzle 28. For example, the nozzle 28 can be positioned near and/or adjacent a top of the housing 12.

The dispenser 10 can include a power supply 60. In some embodiments, the power supply 60 can be a battery. In certain embodiments, the power supply 60 includes electronics for accepting AC or DC power. In some implementations, the power supply 60 can be configured to interface with a standard domestic electrical supply (e.g., 120 volt alternating current). The power supply 60 is described in more detail below.

In certain embodiments, the dispenser 10 has a pump actuation system 30, which in turn includes a sensor, such as a proximity sensor device 32, and a light receiver, such as light receiving portion 42. In some embodiments, a beam of light 44 can be emitted from the light emitting portion 40 and received by the light receiving portion 42.

The sensor 32 can be configured to emit a trigger signal when the light beam 44 is blocked. For example, if the sensor 32 is activated, and the light emitting portion 40 is activated, but the light receiving portion 42 does not receive the light emitted from the light emitting portion 40, then the sensor 32 can emit a trigger signal. This trigger signal can be used for controlling operation of the motor or an actuator 34, described in greater detail below. This type of sensor can provide further advantages.

For example, because in some embodiments the sensor 32 can be an interrupt-type sensor, it can be triggered when a body is disposed in the path of the beam of light 44. The sensor 32 is not or need not be triggered by movement of a body in the vicinity of the beam 44. Rather, in some embodiments, the sensor 32 can be triggered only if the light beam 44 is interrupted. To provide further or alternative prevention of unintentional triggering of the sensor 32, the sensor 32, including the light emitting portion 40 and the light receiving portion 42, can be recessed in the housing 12.

In certain implementations, the sensor 32 only requires enough power to generate the low power beam of light 44, which may or may not be visible to the human eye, and to power the light receiving portion 42. These types of sensors require far less power than infrared or motion-type sensors. In some embodiments, the sensor 32 can be operated in a pulsating mode. For example, the light emitting portion 40 can be powered on and off in a cycle such as, for example, for short bursts lasting for any desired period of time (e.g., less than or equal to about 0.01 second, less than or equal to about 0.1 second, or less than or equal to about 1 second) at any desired frequency (e.g., once per half second, once per second, once per ten seconds). These different time characteristics can be referred to as an activation period or frequency, which corresponds to the periodic activation of the sensor 32. Thus, an activation frequency of four times per second would be equivalent to an activation period of once per quarter second.

The other aspect of this characteristic can be referred to as an activation duration. Thus, if the sensor 32 is activated for 50 microseconds, 50 microseconds is the activation duration time period. Cycling can greatly reduce the power demand for powering the sensor 32. In operation, cycling does not degrade performance in some embodiments because the user generally maintains his or her body parts or other appendage or device in the path of the light beam 44 long enough for a detection signal to be generated and to trigger the sensor 32.

The sensor 32 can be connected to a circuit board, an integrated circuit, or other device for triggering the actuator 34. In some embodiments, the sensor 32 can be connected to an electronic control unit ("ECU") 46. The ECU 46 can include one or a plurality of circuit boards, which can provide hard wired feedback control circuits, a processor and a memory or storing and performing control routines, or any other type of controller. In some embodiments, the ECU 46 can include an H-bridge transistor/MOSFET hardware configuration which allows for bidirectional drive of an electric motor, and a microcontroller such as Model No. PIC16F685 commercially available from the Microchip Technology Inc., and/or other devices.

The actuator 34 can be any type of actuator. For example, the actuator 34 can be an AC or DC electric motor, stepper motor, server motor, solenoid, stepper solenoid, or any other type of actuator. In some embodiments, the actuator 34 can be connected to the pump 18 with a transmitter, such as a transmitter device 50. For example, the transmitter device 50 can include any type of gear train or any type of flexible transmitter assembly.

The dispenser 10 can include a user information receiver, such as a user input device 52. The user input device 52 can be any type of device allowing a user to input a command into the ECU 46. In some embodiments, the input device 52 can be in the form of a button configured to allow a user to depress the button so as to transmit a command to the ECU 46. For example, the ECU 46 can be configured to actuate the actuator 34 to drive the pump 18 any time the input device 52 can be actuated by a user. The ECU 46 can be configured to provide other functions upon the activation of the input device 52, described in greater detail below.

The dispenser 10 can include a selector, such as a selector device 54. The selector device 54 can be any type of configuration allowing the user to input a proportional command to the ECU 46. For example, the selector device 54 can have at least two positions, such as a first position and a second position. The position of the selector device 54 can be used to control an aspect of the operation of the dispenser 10.

For example, the selector device 54 can be used as a selector for allowing a user to select different amounts of liquid L to be dispensed from the nozzle 28 during each dispensation cycle. When the selector device 54 is in a first position, the ECU 46 can operate the actuator 34 to drive the pump 18 to dispense a predetermined amount of liquid L from the nozzle 28, each time the sensor 32 is triggered. When the selector device 54 is in the second position, the ECU 46 can actuate the actuator 34 to dispense a larger amount of liquid L from the nozzle 28.

In some embodiments, the selector device 54 can provide a virtually continuous range of output values to the ECU 46, or a larger number of steps, corresponding to different volumes of liquid L to be dispensed each dispensation cycle performed by the ECU 46. Although the positions of the selector device 54 may correspond to different volumes of liquid L, the ECU 46 can correlate the different positions of the selector device 54 to different duty cycle characteristics or durations of operation of the actuator 34, thereby at times discharging differing or slightly differing volumes of liquid L from the nozzle 28.

The dispenser 10 can include an indicator, such as an indicator device 56 configured to issue a visual, aural, or other type of indication to a user of the dispenser 10. For example, in some embodiments, the indicator 56 can include a light and/or an audible tone perceptible to the operator of the dispenser 10. In some embodiments, the ECU 46 can be configured to actuate the indicator 56 to emit a light and/or a tone after a predetermined time period has elapsed after the actuator 34 has been driven to dispense a predetermined amount of liquid L from the nozzle 28. The indicator device 56 can provide a reminder to a user of the dispenser 10 to continue to wash their hands until the indicator 56 has been activated. This predetermined time period can be at least about 20 seconds, although other amounts of time can be used. The indicator 56 can be used for other purposes as well.

In some embodiments, the indicator 56 can be activated for a predetermined time after the pump has completed a pumping cycle. For example, the ECU 46 can be configured to activate the indicator 56 for 20 seconds after the pump 18 has been operated to discharge an amount of liquid from the nozzle 28. The indicator 56 can be activated at the appropriate time for advising users as to how long they should wash their hands.

In some embodiments, the indicator 56 can be a Light Emitting Diode (LED) type light, and can be powered by the ECU 46 to blink throughout the predetermined time period. Thus, a user can use the length of time during which the indicator 56 blinks as an indication as to how long the user should continue to wash their hands with the liquid disposed from the nozzle 28. Other types of indicators and predetermined time periods can be used.

In operation, the ECU 46 can activate the sensor 32, continuously or periodically, to detect the presence of an object between the light emitting portion 40 and the light receiving portion 42 thereof. When an object blocks the light beam 44, the ECU 46 determines that a dispensing cycle should begin. The ECU 46 can then actuate the actuator 34 to drive the pump 18 to thereby dispense liquid L from the nozzle 28.

In some embodiments, the ECU 46 can vary the amount of liquid L dispensed from the nozzle 28 for each dispensation cycle, depending on a position of the selector 54. Thus, for example, the dispenser 10 can be configured to discharge a first volume of liquid L from the nozzle 28 when the selector 54 is in a first position, and to discharge a second different amount of liquid L when the selector 54 is in a second position. In some embodiments, the ECU 46 can vary the amount of liquid L dispensed based on an input, such as the distance from a detected object to the sensor 32.

As noted above, the indicator 56 can be activated, by the ECU 46, after a predetermined amount of time has elapsed after each dispensation cycle. The ECU 46 can be configured to cancel or prevent the indicator 56 from being activated if the button 52 has been actuated in accordance with a predetermined pattern. For example, the ECU 46 can be configured to cancel the activation of the indicator 56 if the button 52 has been pressed twice quickly. However, any pattern of operation of the button 52 can be used as the command for canceling the indicator 56. The dispenser 10 can include other input devices for allowing a user to cancel the indicator 56.

In some embodiments, the ECU 46 can be configured to continuously operate the actuator 34 or to activate the actuator 34 for a maximum predetermined time when the button 52 is depressed. This can allow an operator of the dispenser 10 to manually operate the dispenser to continuously discharge or discharge larger amounts of liquid L when desired. For example, if a user of the dispenser 10 wishes to fill a sink full of liquidy water for washing dishes, the user can simply push the button 52 and dispense a larger amount of liquid than would normally be used for washing one's hands, such as at least about 3 milliliters or at least about 4 milliliters.

FIGS. 2-13 illustrate an example of the liquid dispenser of FIG. 1 in the form of a dispenser 100. The dispenser 100 can include a housing 112 (which can include any of the features of the housing 12) and a liquid handling system 114 (which can include can include any of the features of the housing 14). The liquid handling system 114 can include a reservoir 116, a pump 118, and a discharge assembly 120 (which can respectively include any of the features of the reservoir 16, pump 18, and discharge assembly 20). The dispenser 100 can include any one, or any combination, of the features of the dispenser 10. The illustrated example is portable, meaning that it is light, free-standing and independent, and can be easily and conveniently transported by a consumer from one location to another without heavy lifting and without installation or attachment to other structures or equipment. In some embodiments, as shown, it can be wireless and/or cordless, storing its own electrical power.

Figure 2:
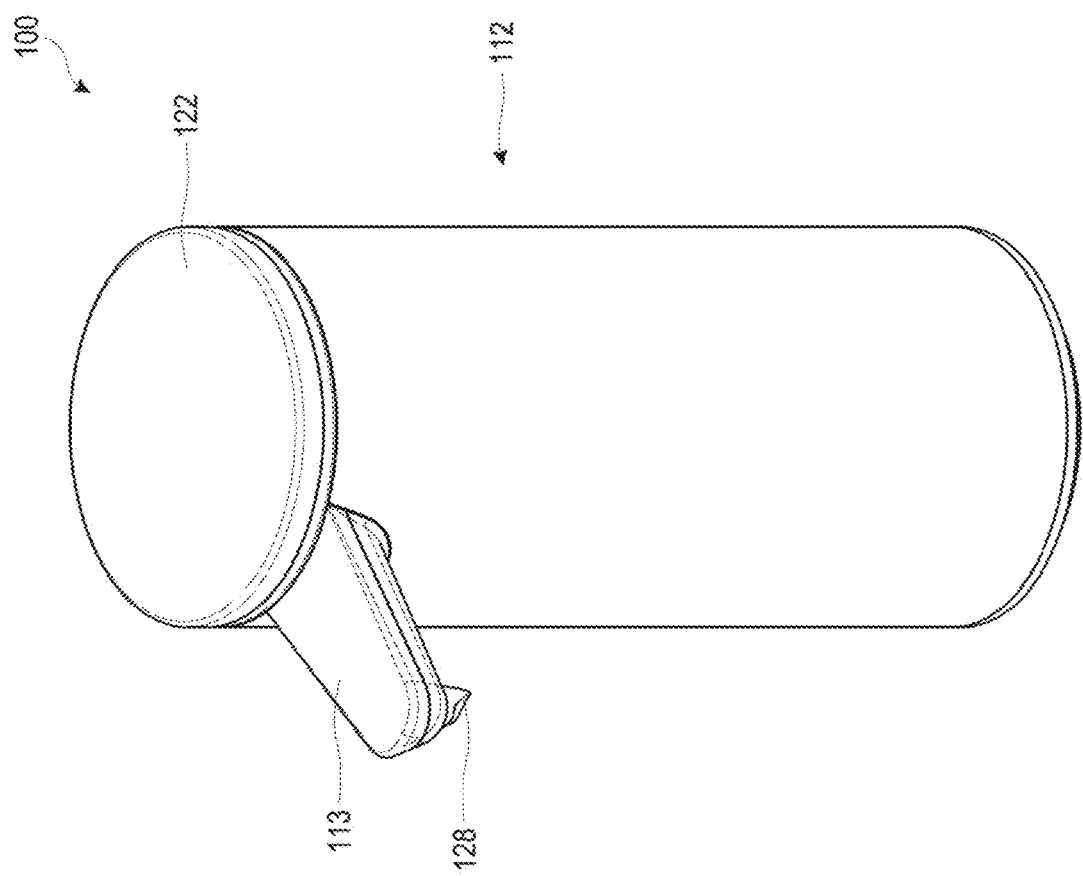
FIG. 2 illustrates a top, front, and side perspective view of an embodiment of a liquid dispenser.
Figure 3:
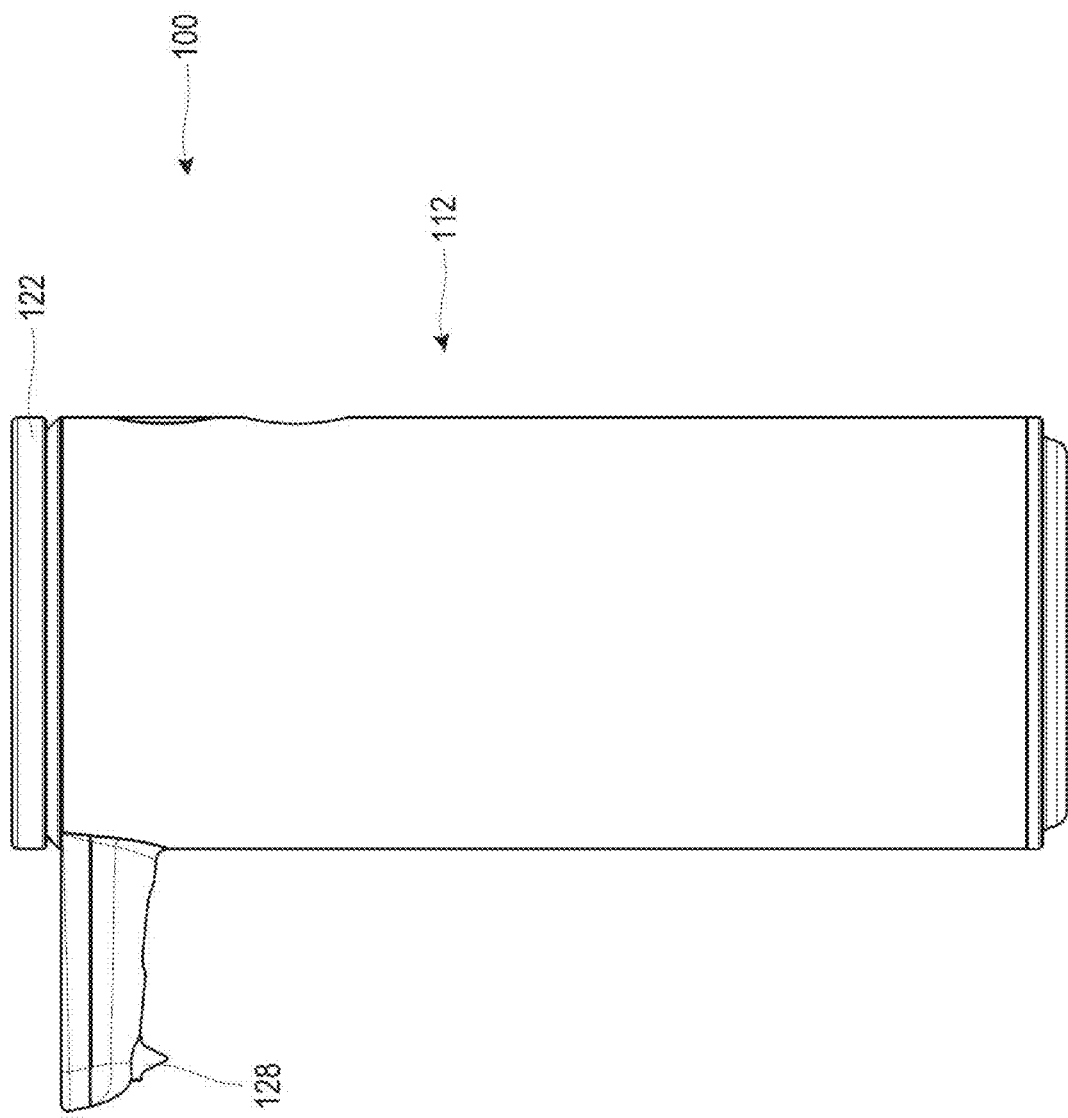
FIG. 3 illustrates a side view of the liquid dispenser of FIG. 2.
Figure 4:
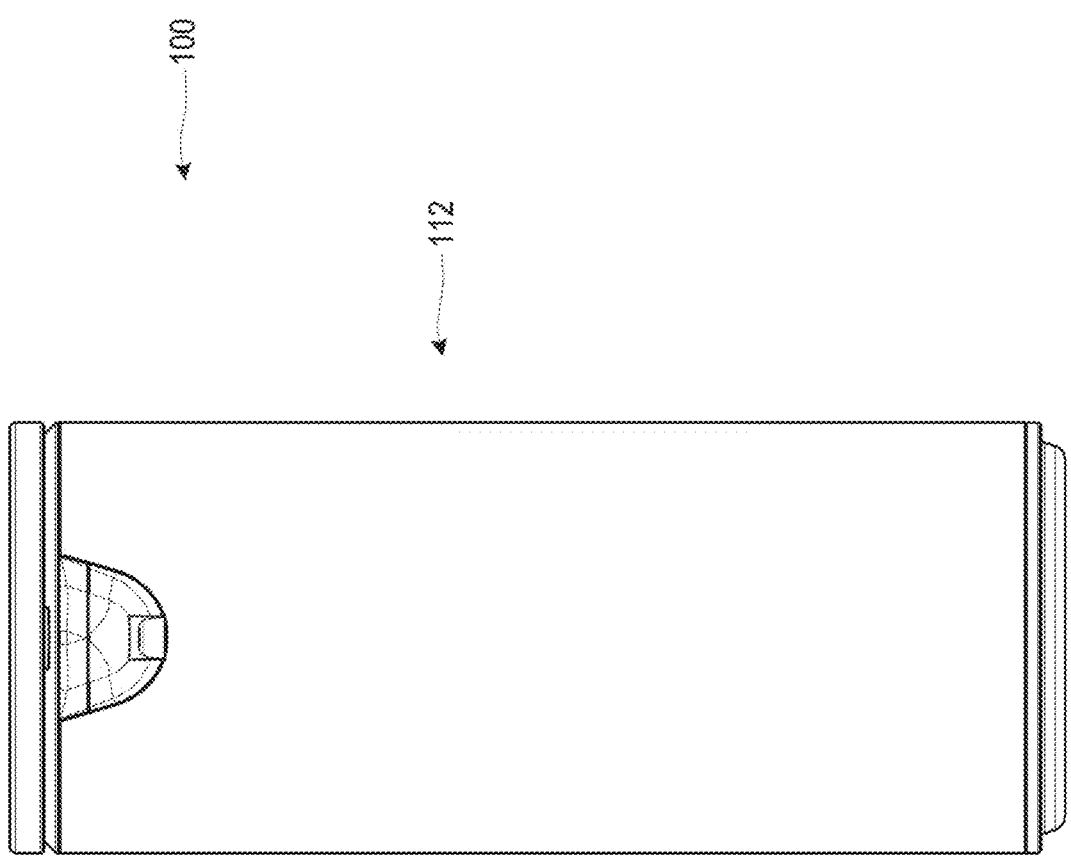
FIG. 4 illustrates a front view of the liquid dispenser of FIG. 2.

As shown in at least FIGS. 2-4, the lower portion of the dispenser 100 can be designed to support the housing 112 on a generally flat surface, such as those normally found on a countertop in a bathroom or a kitchen. Further, some embodiments of the dispenser 100 are movable. For example, the dispenser 100 can be readily relocated from one position to another position on a countertop. In some implementations, the dispenser 100 is not attached, embedded, or otherwise joined with a surface that supports the dispenser 100. For example, certain implementations of the dispenser 100 are not mounted to, or recessed in, a countertop or wall.

Figure 5:
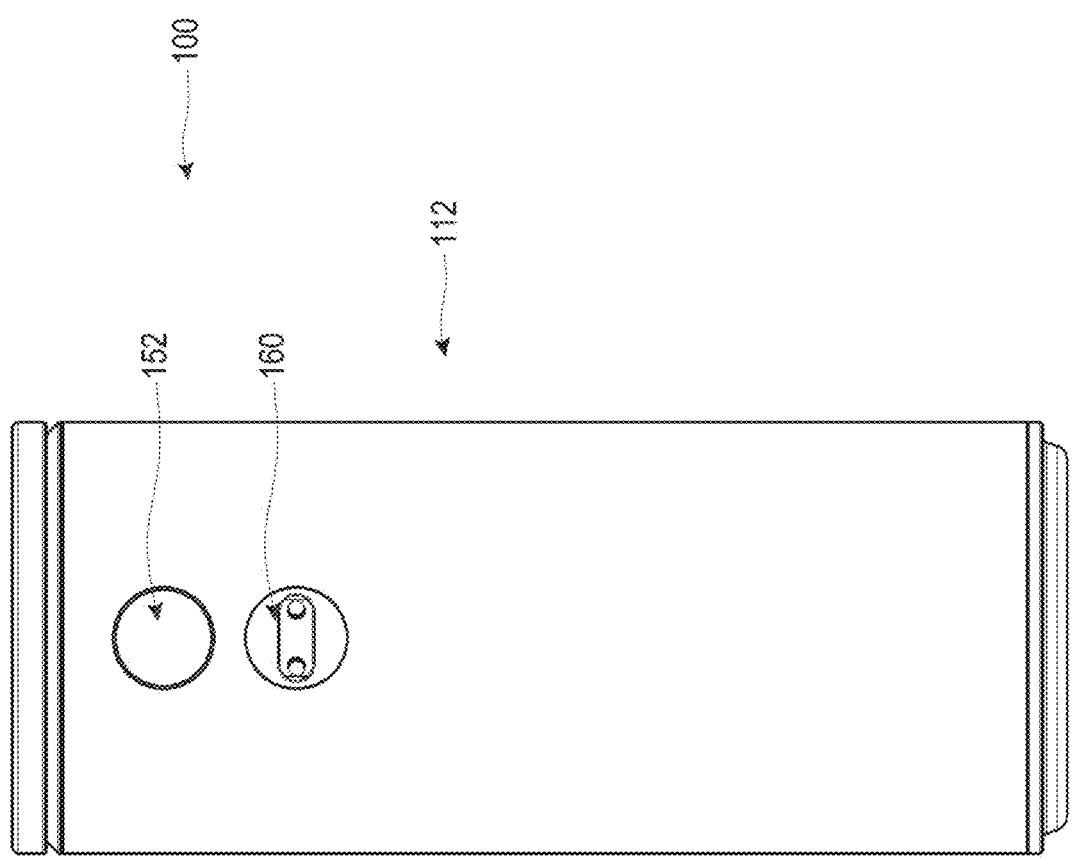
FIG. 5 illustrates a rear view of the liquid dispenser of FIG. 2.

As shown in FIG. 5, the dispenser 100 can include a user input device 152, such as a button, switch, or otherwise. The user input device 152 can be configured to act as a power actuator that enables a user to turn the liquid dispenser on and off. The user input device 152 can be configured to be depressed by the touch of a user. In some embodiments, the user input device 152 includes a sensor such that the user input device 152 does not need to be depressed to turn the liquid dispenser on and off. In several embodiments, the user input device 152 can be actuated to provide an input to the dispenser 100 (e.g., to the ECU). For example, in some variants, the user input device 152 can be actuated for an extended period (e.g., at least about three seconds) to indicate to the dispenser 100 to dispense a large amount of liquid, such as an amount sufficient for washing a kitchen sink full of dishes. In some variants, the dispenser 100 continuously dispenses liquid while the input device 152 is actuated.

In some embodiments, the dispenser 100 includes a power supply 160, such as a battery, capacitor, or other power storage device. In some variants, at least a portion of the power supply 160 is located in the liquid handling system 114. For example, in certain embodiments (e.g., in some embodiments in which the reservoir 116 is a disposable item), a battery or other power storage device can be located in the liquid handling system 114. In some embodiments, the power supply 160 is positioned within the housing 112. In some embodiments, the power supply 160 is positioned adjacent the lid 122. In some embodiments, the power supply 160 is positioned adjacent a bottom of the housing 112. In some embodiments, the power supply 160 is positioned adjacent a side wall of the housing 112. For example, the power supply 160 can be positioned adjacent the user input device 152. In some embodiments, the power supply 160 and/or the user input device 152 are positioned at a rear of the housing 112.

In some embodiments, the power supply 160 is configured to connect with an external power source for recharging, such as with a port or cord to connect with a universal serial bus (USB) cable and/or domestic power. In some embodiments, the power supply 160 is configured to engage with the cord. For example, the power supply 160 can include an attachment such as an engaging element (e.g., a magnet) that is configured to engage (e.g., magnetically couple) with a corresponding engaging element (e.g., another magnet) of the cord, which can aid in locating and/or securing the cord on the power supply 160. For example, some embodiments are configured such that, when the engaging elements of the power supply 160 are engaged with the engaging elements of the cord, a contact of the power supply 160 is automatically electrically connected with a contact of the cord, thereby allowing electrical power to be provided from the cord to the power supply 160.

In some implementations, the power supply 160 is configured to engage with a head portion of the cord in multiple orientations and/or to enable a user to flip the head portion around yet still be able to engage with the power supply 160. In some implementations, the power supply 160 and/or the head portion are configured to facilitate engagement. For example, one of the power supply 160 and the head portion can include a projection and the other of the power supply 160 and the head portion can include a recess configured to receive the projection. In some embodiments, the head portion of the cord has a generally cylindrical shape.

In various embodiments, the power supply 160 is sealed, such as with a gasket, adhesive, welds, or otherwise. This can reduce the chance of water intrusion into the power supply 160 and/or the liquid handling system 114. Certain implementations are configured to inhibit or prevent water from entering the power supply 160 and/or passing between the power supply 160 and a lid 122. In some embodiments, the user input device 152 comprises a material that is electrically conductive and resistant to corrosion in the presence of freshwater, such as stainless steel, copper, aluminum, or otherwise.

Figure 6:
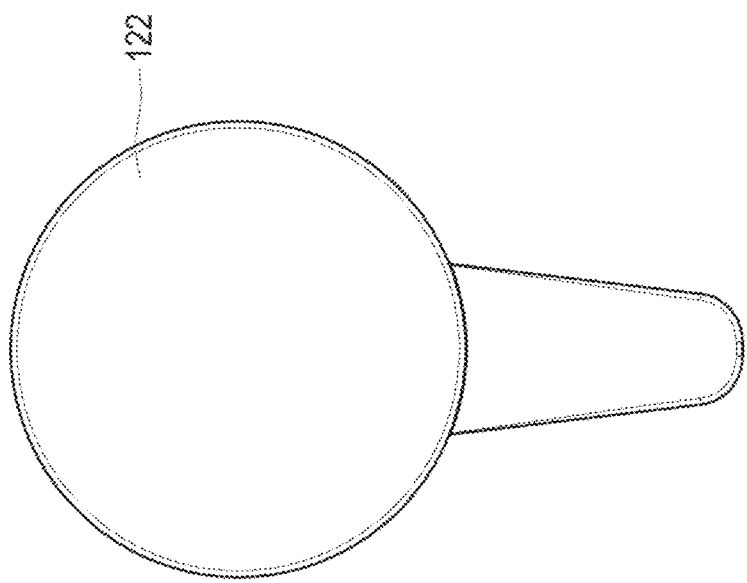
FIG. 6 illustrates a top view of the liquid dispenser of FIG. 2.

In some embodiments, the liquid handling system 114 is configured to avoid accumulating water in and/or near the power supply 160. This can reduce the chance of corrosion of the power supply 160 and/or other portions of the liquid handling system 114. As previously mentioned, the power supply 160 can be accessed via a top of the liquid handling system 114 and/or the side of the liquid handling system 114. In some embodiments, the user input device 152 is positioned in a bulge of the side of the housing 112, such as a hemispherical or frustoconical bulge. In various implementations, the user input device 152 is not positioned in a recess. In some embodiments, such as is shown in FIG. 6, the lid 122 can be generally planar and/or flat. Further details regarding the power supply 160 and other features can be found in U.S. Patent Application Publication No. 2016/0256016, filed Mar. 3, 2016, the entirety of which is hereby incorporated by reference herein.

Figure 7:
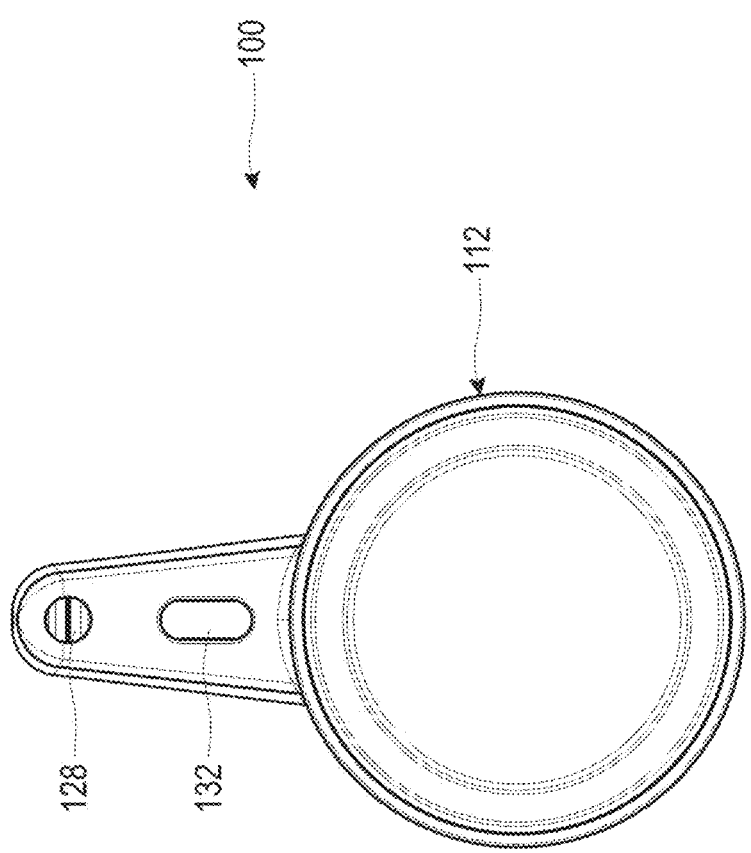
FIG. 7 illustrates a bottom view of the liquid dispenser of FIG. 2.

As illustrated in FIG. 7, the dispenser 100 can include a sensor 132. The sensor 132 can be activated continuously or periodically. In some embodiments, the sensor 132 is configured to detect the presence of an object between the light emitting portion and the light receiving portion thereof. As discussed above, when an object blocks the light beam, the dispenser 100 can determine that a dispensing cycle should begin, such as actuating the user input device 152 to drive the pump 118 to thereby dispense liquid L from a nozzle 128. In some embodiments, the sensor 132 transmits a signal and detects reflections of the signal, such as reflected infrared signals of a person's hand.

Figure 8:
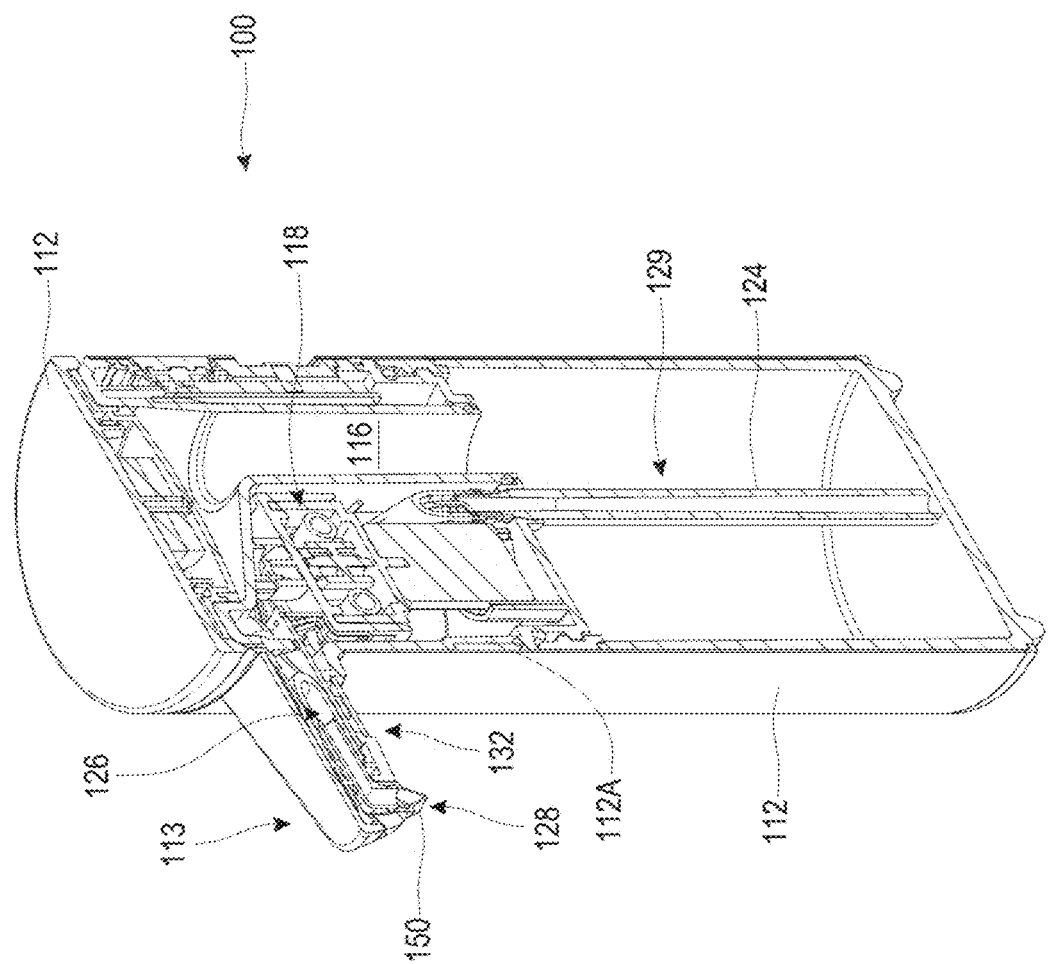
FIG. 8 illustrates a side cross-sectional view of the liquid dispenser of FIG. 2.

As shown in FIG. 8, certain embodiments include a casing 112A, such as a rigid plastic or metal shell. In some embodiments, the casing 112A is positioned entirely within the housing 112. In some embodiments, the casing 112A is positioned at least partially within the housing 112. In some embodiments, the casing 112A includes an upper portion and lower portion. The upper and lower portions can be joined together, such as with fasteners, adhesive, and/or welding (e.g., ultrasonic welding). The casing 112A can be configured to protect and/or retain some or all of the components of the liquid handling system 114, such as the motor 134 and/or the pump 118. In some embodiments, the casing 112A includes one or more seals (e.g., rubber gaskets) that are configured to engage with the housing 112 and/or to inhibit water from passing between the casing 112A and the housing 112.

In some implementations, the fluid handling unit 104 includes a lid 122. The lid 122 can engage with the casing 112A and/or the housing 112 to seal and/or protect components of the liquid handling system 114, such as the motor 134 and/or the pump 118, among other components described herein. For example, the engagement between the lid 122 and the casing 112A can inhibit water and dirt from entering the liquid handling system 114. In some embodiments, the lid 122 engages a seal (e.g., a rubber gasket) to provide a generally liquid tight seal. In certain embodiments, the lid 122 is configured to shed water. For example, the lid 122 can be pitched, such as being higher at the radial middle than at the radial edge. In some embodiments, the lid 122 is substantially flat.

The reservoir 116 can be disposed within the housing 112. The pump 118 can be disposed above at least a portion of the reservoir 116, as described in more detail below. As discussed above, the pump 118 can be connected to the reservoir 116 by a tube 124. For example, liquid can travel from the reservoir 116 through the tube 124 and passes through the pump 118. Any type or diameter of tube 124 can be used. In some embodiments, the tube 124 can include plastic, metal, and/or rubber, among other materials.

The tube 124 can be at least partially positioned within the reservoir 116. For example, a bottom end of the tube 124 can be positioned at a lower end of the reservoir 116. In some embodiments, the bottom end of the tube 124 is positioned at a lower ½, ⅓, ¼, and/or ⅛ of the reservoir 116 such that the bottom end of the tube 124 is spaced upwardly from the bottom of the reservoir 116. In some embodiments, the tube 124 is raised from the bottom of the reservoir 116, but is positioned closer to the bottom of the reservoir 116 than the top of the reservoir 116.

The dispenser 100 can have a passageway 129 for liquid to travel from the reservoir 116 to the nozzle 128. The passageway 129 can include the tube 124, which can be a portion of the passageway 129 that is upstream of the pump 118. The passageway 129 can include a conduit 126, which can be a portion of the passageway 129 that is downstream of the pump 118.

As described in more detail below, the pump 118 can displace fluid. For example, the pump 118 can be configured to draw liquid from the reservoir 116 into the tube 124 and/or to push the liquid through the conduit 126 to be discharged out of the nozzle 128. In some embodiments, the conduit 126 is connected to the tube 124 at one end and to the nozzle 128 at the other end. In some embodiments, the conduit 126 refers to a portion of the tube 124 that extends between the pump 118 and the nozzle 128. In some embodiments, the conduit 126 is integrally formed with the tube 124. In some embodiments, the conduit 126 is separately formed from the tube 124 such that the conduit 126 is connected to the tube 124 at one end of the pump 118. In some embodiments, the conduit 126 and the tube 124 are sealingly engaged to inhibit or prevent outside air and/or fluid from entering the tube 124 and/or the conduit 126 or contaminating the fluid traveling through the tube 124 and/or the conduit 126.

In certain variants, the pump 118 can encourage fluid to flow through the passageway 129, so that the fluid can be discharged from the nozzle 128. As described in more detail below, the pump 118 can enable the dispenser 100 to dispense fluid more efficiently and/or can reduce the chance of leakage (compared to certain other types of liquid pumps, such as certain liquid pumps with gear pumps). In some embodiments, the tube 124 extends from the reservoir 116 to the nozzle 128 and passes through the pump 118. The portion of the tube 124 in the pump 118 can be resilient and/or flexible.

Some configurations can maintain a separation between the interior of the tube 124 and the interior of the pump 118. For example, the liquid passing through the tube 124 can be segregated from and/or kept apart from the interior of the pump 118. In some embodiments, the liquid L does not contact an interior of the pump 118 as the liquid L passes through the pump 118. In several embodiments, liquid L does not directly contact the pump 118. This can aid in reducing problems, such as problems associated with prolonged disuse of the pump 118. In some other liquid pumps, with prolonged disuse, liquid can dry inside the pump, which can hinder and/or prevent operation of the pump 118.

The pump 118 can reduce or avoid such problems by maintaining a separation between the liquid L and the pump 118. For example, the liquid L can be maintained within the passageway 129. In some embodiments, the maintaining a separation between the liquid L and the pump 118 can facilitate the use of liquid with particulates (e.g., beads, granules, or otherwise), which could be problematic if not maintained separately. For example, in the context of a gear pump, the particulates could become lodged in and/or bind the gears and/or could increase the time required to prime the pump. The pump 118 can reduce or avoid such concerns.

In some embodiments, the nozzle 128 can be disposed in a manner such that the nozzle 128 extends outwardly from the periphery of the housing 112 of the dispenser 100. For example, as shown in FIG. 8, the housing 112 can include a cantilevered portion that includes the nozzle 128. If a user misses liquid dispensed from the nozzle 128, and the liquid L falls, it will not strike on any portion of the housing 112. This helps prevent the dispenser 100 from becoming soiled from dripping liquid L.

In some embodiments, the nozzle 128 can be mounted on the exterior of the housing 112 of the dispenser 100. For example, the nozzle 128 can be spaced outwardly from an upper portion of the housing 112 of the dispenser 100. In some embodiments, the nozzle 128 is at least partially surrounded by a spout housing 113. The spout housing 113 can at least partially surround the conduit 126. In some embodiments, the spout housing 113 extends from an outer periphery of the housing 112. In some embodiments, the spout housing 113 extends from an upper portion of the housing 112. In some embodiments, the spout housing 113 is integrally formed with the housing 112. In some embodiments, the spout housing 113 can be otherwise connected to the housing 112. For example, the spout housing 113 can be fastened to the housing 112 using any number of mechanical fasteners. In some embodiments, the spout housing 113 is configured to slidably engage a portion of the housing 112 such that the spout housing 113 slides into a recess and/or a slot in the housing 112. In some embodiments, a seal is formed between the spout housing 113 and the housing 112 to inhibit or prevent contaminants from entering the interior of the dispenser 100. In some embodiments, the nozzle 128 can be mounted partially within or completely within the housing 112 of the dispenser 100.

The nozzle 128 can be positioned substantially vertically (e.g., a longitudinal axis of the nozzle forms a substantially right angle with a plane on which the dispenser rests). Such a configuration can, for example, facilitate (e.g., by force of gravity) outflow of the liquid L from the nozzle 128. In some implementations, the nozzle 128 can be positioned at another angle. For example, the nozzle 128 can be positioned so as to dispense liquid horizontally (e.g., substantially parallel to a plane on which the dispenser 100 rests).

In some implementations, the nozzle 128 includes a one-way valve 150, which can be in the form of a flap-type valve. Such a configuration can, for example, reduce the likelihood that air or contaminants may enter the valve 150, which could lead to improper liquid flow from the nozzle 128 and/or drying of liquid disposed in the nozzle 128. Of course, other types and/or configurations of one-way valve are contemplated, such as flap valves, ball valves, diaphragm valve, lift valves, other kinds of check valves, and the like.

In some embodiments, the nozzle 128 can include an inlet collar with an interior passage having inlet end and an outlet end. The valve 150 can be formed with at least a deflectable member, such as a flap. In some embodiments, the deflectable member can be configured to move toward an open position when a pressure condition is satisfied. The pressure differential (compared to the ambient pressure acting on an exterior surface of the nozzle 128) at which the deflectable member begins to move toward the open position, and thus the nozzle 128 begins to open, can be referred to as the "cracking pressure." In some embodiments, the cracking pressure can be at least about 0.2 psi and/or equal to or less than about 0.3 psi. In some embodiments, the cracking pressure is less than or equal to about 0.4 psi.

In the illustrated embodiment, the valve 150 includes two slanted deflectable members that form an acute angle with each other. Such a configuration is sometimes referred to as a "duckbill valve". However, a duckbill valve is merely one type of deflectable member valves that can be used as the nozzle 128. Further details regarding the valve 150 and other features can be found in U.S. Pat. No. 9,265,383, issued Feb. 23, 2016, the entirety of which is hereby incorporated by reference herein.

The liquid handling system 114 can include a pump 118. The pump 118 can comprise a high pressure and/or a positive displacement pump for driving a fluid (e.g., liquid or air) through the passageway 129. In some embodiments, the pump 118 comprises a peristaltic pump, but any other types of pumps 118 are contemplated as well, such as a screw pump, piston pump, diaphragm pump, or otherwise.

Figure 9:
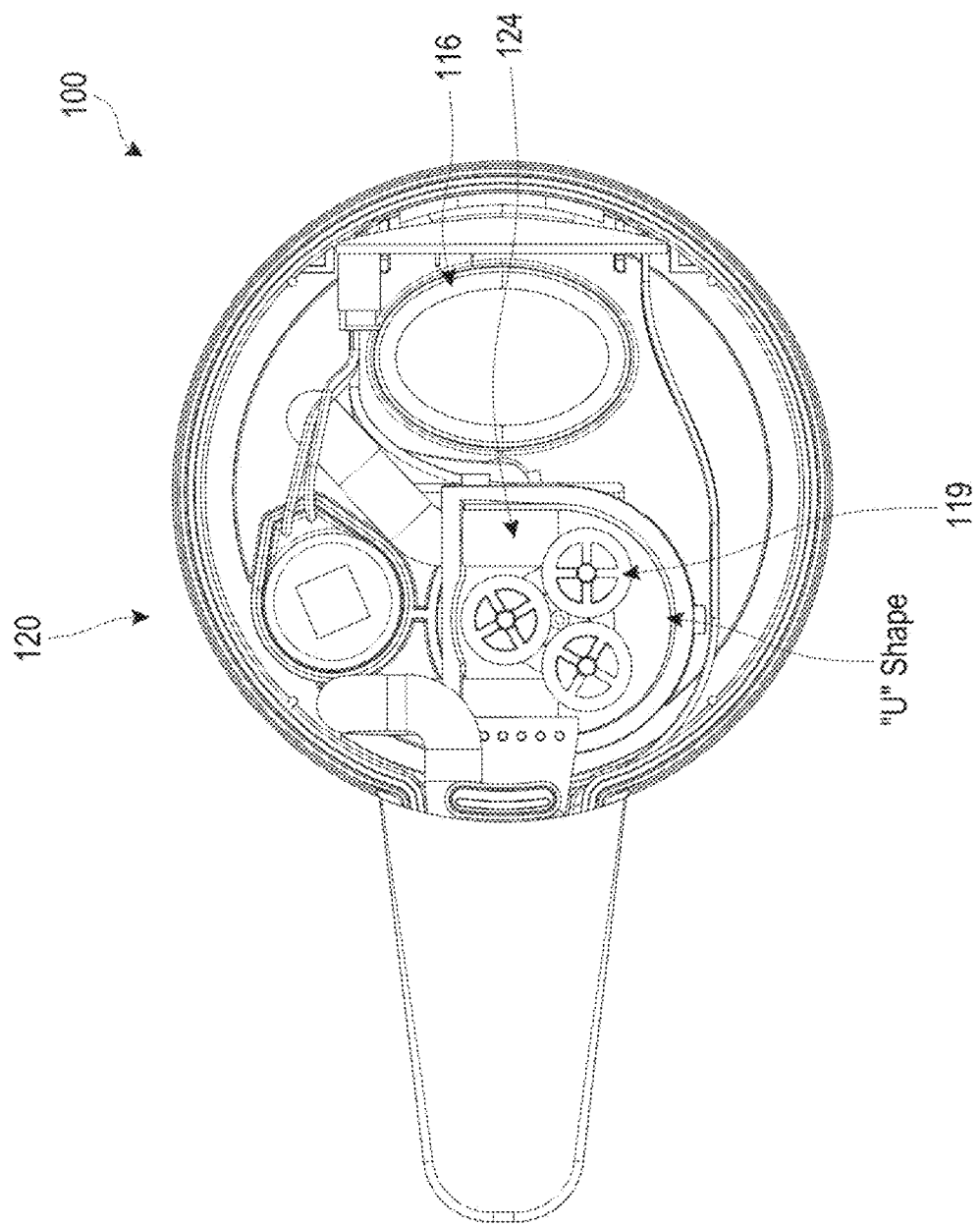
FIG. 9 illustrates a top cross-sectional view of the liquid dispenser of FIG. 2.

In some embodiments, a portion of the passageway 129, such as a portion of the tube 124, passes through the pump 118. In certain implementations, such as is shown in FIG. 9, the tube 124 can form a generally U-shape as the tube 124 passes through the pump 118. In some embodiments, the tube 124 has a cross-sectional shape that is generally: squared, rectangular, triangular, circular, or other shapes. The tube can resilient and/or flexible, such as being able to be radially compressed and expanded without substantial plastic deformation.

In some embodiments of peristaltic pumps, as shown in FIGS. 9-12, the pump 118 can include a pumping feature, such as a roller 119. The pump 118 can include a plurality of rollers 119. The rollers 119 can be secured by a roller cover 121. The roller cover 121 can be connected to a top surface of the rollers 119. In some embodiments, the roller cover 121 is connected to an axle 123 that extends through a center of each of the rollers 119. In some embodiments, the pump 118 can include three rollers 119A, 119B, and 119C. In some embodiments, the pump 118 can include one, two, three, four, five, six, seven and/or eight or more rollers 119. In some embodiments, instead of and/or in combination with the rollers 119, the pump 118 can include a plurality of shoes, wipers, lobes, or other types of features to compress the tube 124.

In some embodiments, the rollers 119 are comprised in a rotor, such as a rotor mechanism 127. The rotor mechanism 127 can turn (e.g., rotate) relative to the tube 124. In various embodiments, the rotor mechanism 127 is driven by an actuator 134, such as an electric motor. In some embodiments, an outer circumference of the rotor mechanism 127 can contact and/or compress at least a portion of the tube 124. For example, the rollers 119 can engage (e.g., abut) and compress the tube 124.

The rotor mechanism 127 can be configured such that the rollers 119A, 119B, 119C sequentially contacts and/or compresses at least a portion of the tube 124. For example, the roller 119A can rotate into contact with the tube 124, then the roller 119B can rotate into contact with the tube 124, and then the roller 119C can rotate into contact with the tube 124. In some embodiments, not all of the rollers are in contact with the tube 124 concurrently. For example, in some embodiments, when the roller 119A begins disengaging the tube 124, the roller 119C begins engaging the tube 124. In certain implementations, at any period of time, at least two of the rollers 119 are engaged with the tube 124.

In some embodiments, as the rotor mechanism 127 turns, each of the rollers 119 rotate as well. The turning of the rollers 119 can enable the rollers 119 to roll along and/or turn relative to the tube 124. This can enable the rollers 119 to compress a portion of the tube 124. As the rotor mechanism 127 rotates the rollers 119, and the rollers 119 roll along the tube 124, the compressed portion moves along the length of the tube 124 in the pump 118. The portion of the tube 124 under compression (e.g., by the rollers 119), can occlude or be pinched closed. In some embodiments, the portion of the tube 124 under compression caused by contact with each of the rollers 119 is at least partially pinched closed. This can force the fluid to be pumped to move through the tube 124. As the tube 124 opens to a neutral position (e.g., uncompressed position), after the rotor mechanism 127 passes, fluid flow is induced into the pump 118. In some embodiments, the rollers 119 compress the tube 124 such that at the portion of the tube 124 that is compressed, the diameter of the tube 124 is reduced by approximately 10%, 20%, 30%, 40%, 50%, and/or 60% or more.

As shown in the illustrated embodiment, the pump 118 can include at least three rollers 119A, 119B, 119C. In some embodiments, all three rollers 119A, 119B, 199C can rotate together about a rotor axis of rotation 125A. In some embodiments, the rollers 119A, 119B, 119C can rotate independently about roller axes of rotation 125B and/or an axle that extend through a center of the rollers 119. In some embodiments, the rollers 119A, 119B, 119C rotate independently about a corresponding roller axis of rotation and/or about the rotor axis of rotation simultaneously. The rollers 119 can occlude the tube 124, thereby trapping fluid circumferentially between adjacent rollers 119A, 119B, 119C. As the rollers 119 roll along the tube 124, the trapped fluid can be transported, toward the pump outlet (e.g., towards the conduit 126 and/or the nozzle 128).

The rollers 119 can provide enhanced control of the amount of liquid that is dispensed. In some other types of liquid dispensers (such as certain dispensers with gear pumps), accurate control of the volume of liquid actually dispensed can be difficult, since the pump has a relatively low pressure differential and/or because the pump does not provide discrete pumping amounts. In contrast, the pump 118 can provide a much greater pressure differential and/or can provide discrete pumping amounts. For example, the amount of volume in the tube between adjacent occlusions can be a discrete and known amount, which can enable more accurate control of the dispensation volume. In some embodiments, the pump 118 can provide a pumping pressure of at least about: 0.50 bar, 0.75 bar, 1.0 bar, 1.25 bar, 1.5 bar, 2.0 bar, 2.5, bar, 3.0 bar, or other pressures. In several embodiments, the pump 118 can be positioned near a top of the dispenser 100 and/or near the nozzle 128, which can enhance control of the amount of liquid that is dispensed. Accurate control of the dispensation volume can be particularly important in some applications, such as in certain embodiments that are configured to vary the volume of the dispensation amount based on a parameter (e.g., a distance to a detected object), as is discussed in more detail below.

In some embodiments, the pump 118 can be operated in increments depending on the amount of liquid to be dispensed. In some configurations, the rollers 119 can rotate through partial revolutions to deliver the required amount of liquid. This can facilitate accurate control of the amount of liquid dispensed. For example, the amount of rotation by the rollers 119, individually, and/or the rotor mechanism 127 can correspond to an amount of liquid to be dispensed. For example, the rotor mechanism 127 can rotate about a rotor axis and the rollers 119 can rotate independently about a rotor axis extending through a center of each of the rollers 119. The number of revolutions the rotor mechanism 127 turns about the rotor axis and/or the number of revolutions each roller 119 turns about each roller axis can correspond to a particular volume of liquid to be dispensed by the dispenser 100. In some embodiments, the amount and/or speed of rotation of the rotor mechanism 127 and/or each of the rollers 119 can correspond to a particular volume of liquid to be dispensed.

Figure 9A:
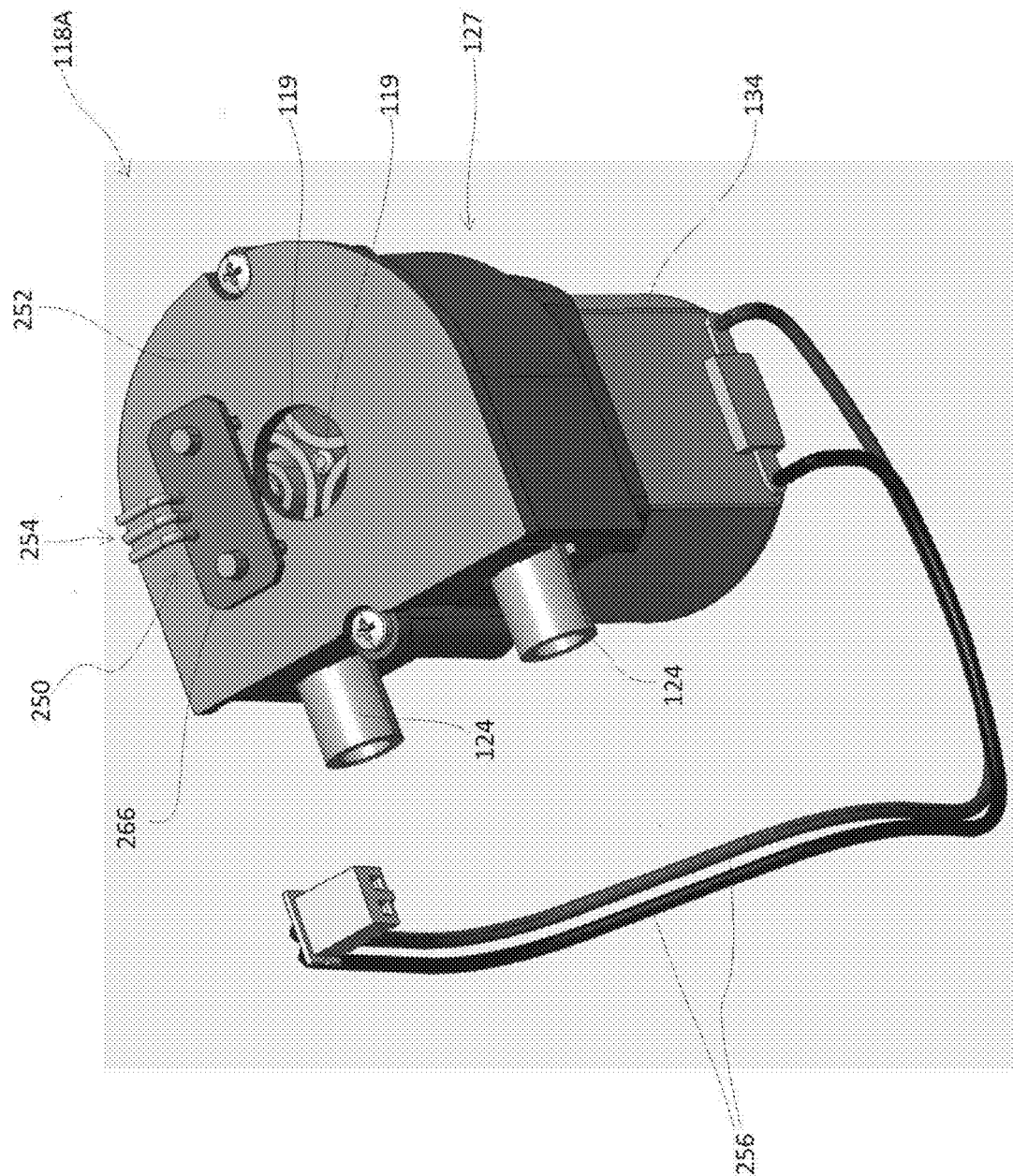
FIG. 9A illustrates another example of a pump for the liquid dispenser that includes a rotation-tracking system.
Figure 9B:
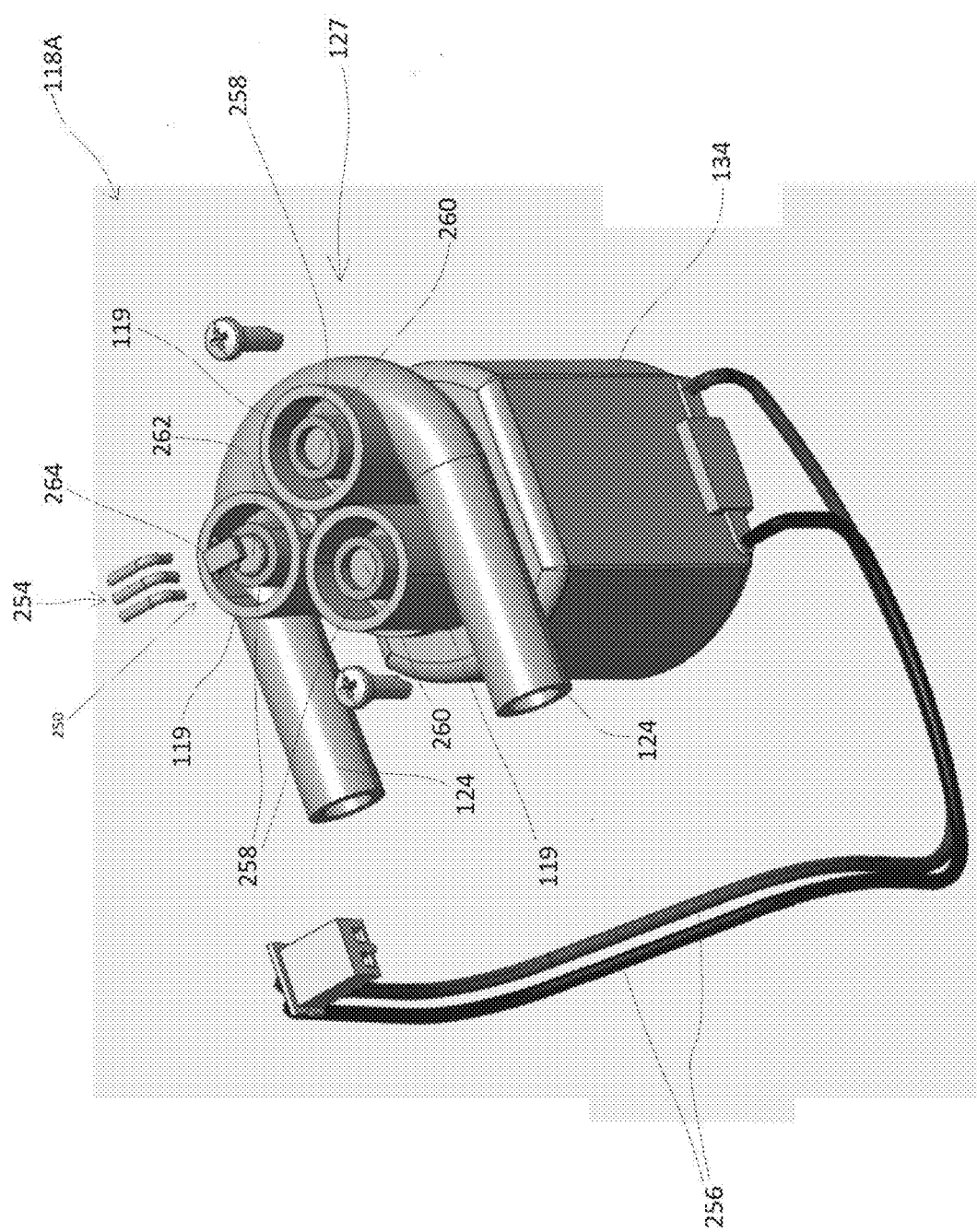
FIG. 9B illustrates the pump of FIG. 9A with a cover plate removed to enable viewing of internal components.
Figure 10:
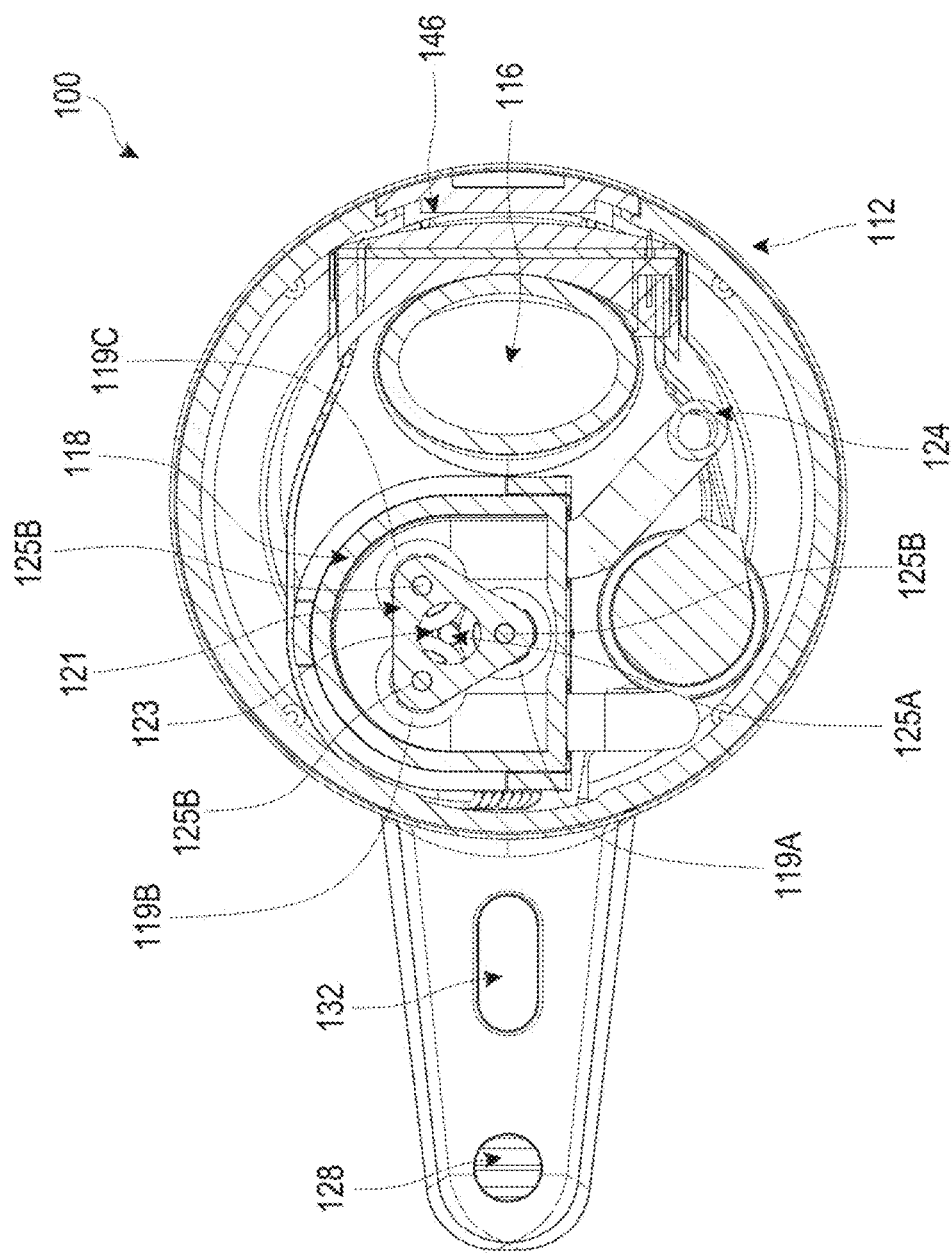
FIG. 10 illustrates a bottom partial cross-sectional view of the liquid dispenser of FIG. 2.
Figure 11:
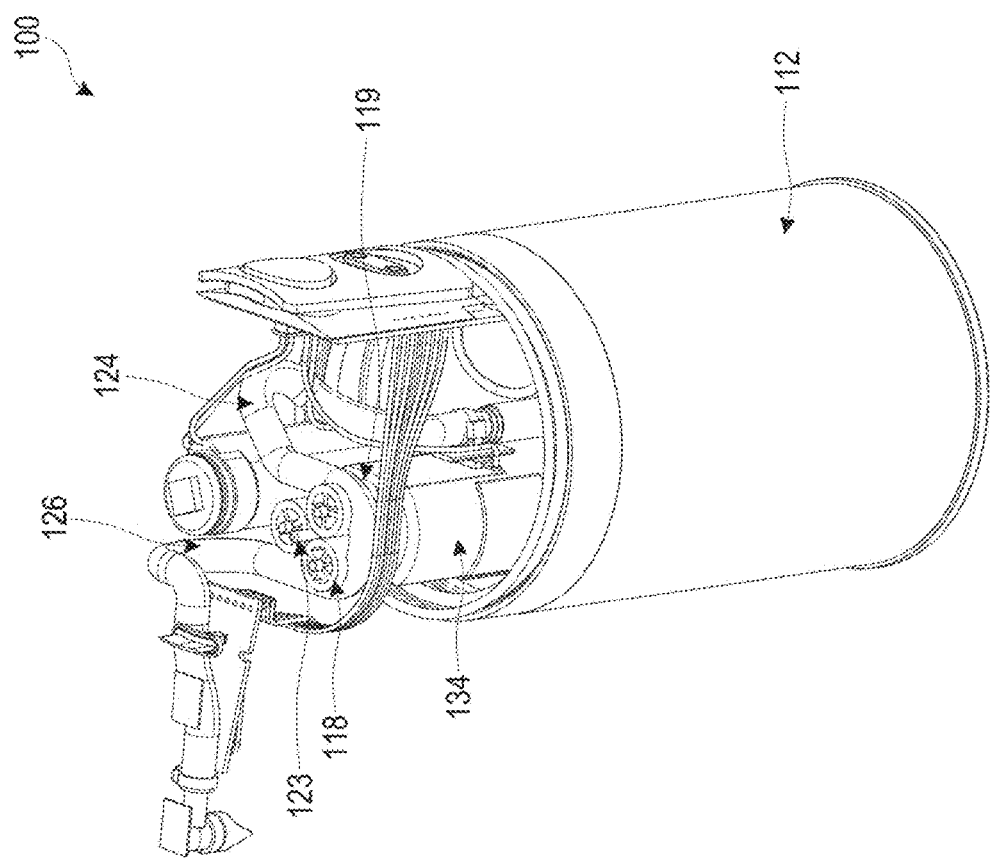
FIG. 11 illustrates a top and side perspective view of the liquid dispenser of FIG. 2 without certain features, such as a portion of a housing.

As illustrated in FIGS. 9A and 9B, another example of a pump 118A that can be used with the liquid dispenser 100 can include a feedback rotation-tracking system 250. FIG. 9A shows the pump 118A with a cover plate 252, and FIG. 9B shows the pump 118A with the cover plate 252 removed to enable viewing some internal parts, including the rollers 119 and a portion of the tube 124 that is in contact with and partially coiled around the rollers 119. By accurately tracking the location of one or more of the rollers 119 with one or more location sensors 250, the ECU 46 of the dispenser 100 can precisely or accurately control the movement of the rotor mechanism 127, thereby precisely and/or accurately determining and/or controlling the amount of liquid that is dispensed from the dispenser 100.

In some embodiments, the rotation-tracking system 250 of the pump 118A can include a sensor for sensing, measuring, determining, and/or tracking the number of rotations and/or the amount of rotation of the rotor mechanism 127. In the example illustrated, the sensor comprises a magnetic sensor 264 or magnetometer connected to a power and communication means in the form of a plurality of wires 254 (in the example shown) or by way of a wireless transceiver. The wires 254 provide power and communication between (e.g., to and/or from) the sensor 264, the ECU 46, and/or the power supply 60. As shown, the magnetic sensor 264 can be mounted or coupled to a backing 266 that is attached to the cover plate 252. In some embodiments, the backing 266 can be or can comprise a printed circuit board (PCB). One or more apertures can be provided in the cover plate 252 to diminish or eliminate attenuation of a magnetic field to be sensed by the magnetic sensor 264.

An example of a suitable magnetic sensor is an omnipolar tunnel magneto-resistance (TMR) digital latch that is integrated into a corresponding CMOS unit. The sensor 264 can be configured to operate on a very small amount of electrical current, such as less than or equal to about 200 nA and/or less than or equal to about 150 nA, helping to preserve battery life between charges or replacements in embodiments that include a battery system in the dispenser. The sensor 264 can be configured to be capable of detecting even a very small magnetic field and/or very small variations in a small magnetic field, such as less than or equal to about 3.0 mT and/or less than or equal to about 2.0 mT. A TMR unit with capabilities of this type is commercially available from *Crocus* Technology.

One or more of the plurality of rollers 119 can include a location or retainer 258 configured to comprise or retain a marker that is configured to mark, indicate, designate, and/or measure the presence, passage, proximity, and/or movement of the roller 119 on which the marker is located or retained. The retainer 258 can comprise a coupling such as a recess 260. In the illustrated example, the marker is a permanent magnetic marker 262 made of ferromagnetic material configured to produce a magnetic field. As shown, the magnetic marker 262 can be securely received in the recess 260, such as by a friction fit and/or by adhesive. The magnetic sensor 264 is configured to be calibrated to sense variations in the proximity of the magnetic marker 262 by measuring the intensity of the magnetic field of the magnetic marker 260, which increases as the magnetic marker 262 rotates into close proximity with the magnetic sensor 264 and which decreases as the magnetic market 262 rotates away from the magnetic sensor 264, in a cyclical manner. The magnetic sensor 264 can produce an electrical signal that is communicated to the ECU 46 that can indicate the proximity of the magnetic marker 262 as a function of time.

The rotation-tracking system 250 provides feedback in the form of an electronic signal to the ECU 46, which permits the ECU 46 to be configured to count, track, estimate, and/or determine the amount of rotation and/or the number of rotations of the rotor mechanism, thereby precisely measuring, determining, and/or approximating over time the volume of liquid that is pumped through the portion of the tube 124 that is partially coiled around or positioned near or in communication with the rollers 119. The ECU 46 controls the motor 134 by selectively supplying electrical power to the motor 134 through the wires 256, and the motor 134 is operatively connected with the rotor mechanism 127 of the pump 118. The ECU 46 can be configured to control the number of rotations of the rollers 119 by selectively turning on and off the power to the motor 134; however, the control of the ECU 46 over the rotation of the rollers 119, and therefore the pumping volume, can be made more accurate and/or more precise by using the feedback signal provided to the ECU 46 via the rotation-tracking system 250.

In some embodiments, the dispenser 100 is configured to reduce the time needed for a user to receive a dispensation of liquid and/or the distance that liquid must travel to be dispensed from the nozzle 128. In some variants, when the pump 118 is in a resting state (e.g., when no liquid is being requested to be dispensed), at least the portion of the tube 124 in contact with one of the rollers 119 remains in a compressed state. This can create a vacuum-like and/or suction effect. For example, liquid within the tube 124 can be inhibited or prevented from being pulled by gravity back into the reservoir 116 because of the vacuum. Thus, in some embodiments, when the tube 124 is in the resting state, the tube 124 remains primed with liquid. This can reduce the time needed for a user to receive a dispensation of liquid and/or the distance that liquid must travel to be dispensed from the nozzle 128

In some embodiments, when liquid is requested by a user, the rotor mechanism 127 and/or each roller 119 can begin to rotate. For example, the motor 134 can rotate the rotor mechanism 127, which in turn rotates the rollers 119. In some implementations, the rotor 127 and/or the rollers 119 are rotated by an amount that corresponds to the volume of liquid to be dispensed. In some embodiments, the rotor mechanism and/or the rollers 119 turn by a predetermined degree of rotation based on a corresponding amount of liquid required to be dispensed. For example, the rotor mechanism 127 and/or the rollers 119 turn by a predetermined degree of rotation based on a reading by the sensor 132. In some embodiments, the dispenser 100 only dispenses a certain amount of liquid upon activation of the dispenser 100. In some configurations, the rotor mechanism 127 and/or the rollers 119 turn by a predetermined degree of rotation each time the dispenser 100 is activated.

Figure 12:
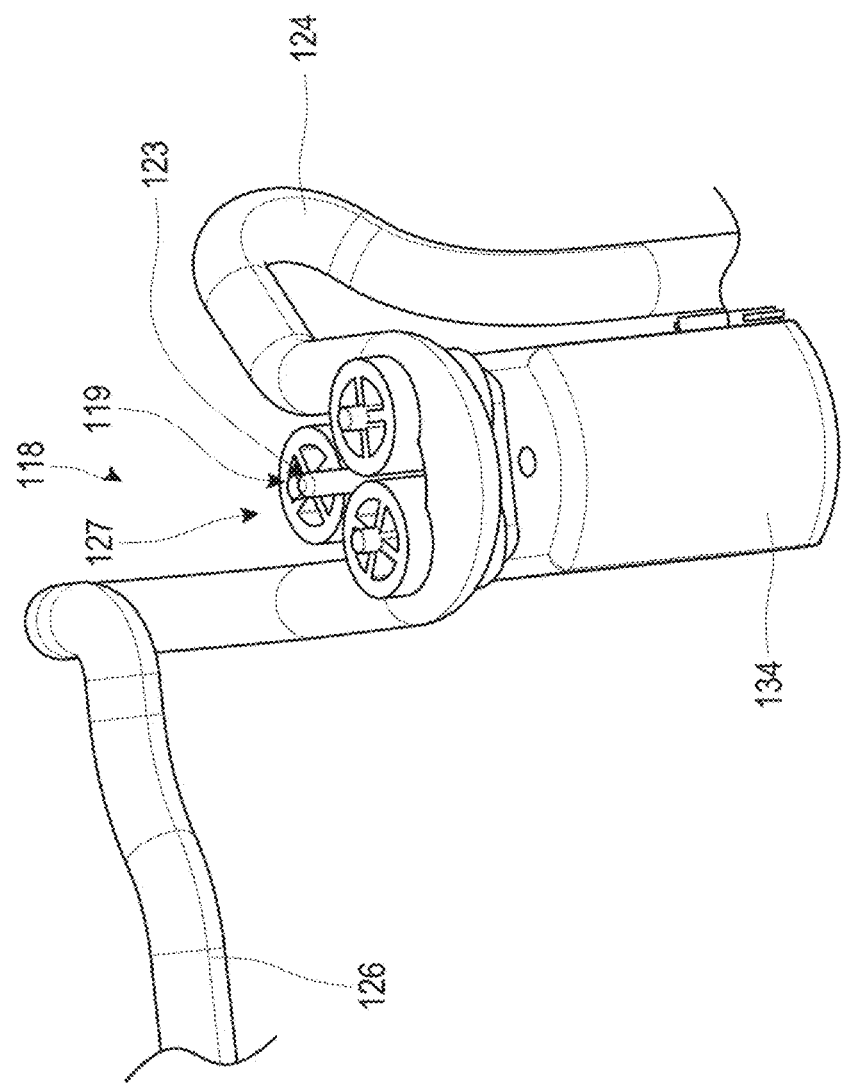
FIG. 12 illustrates an embodiment of a pump and a tube of the liquid dispenser of FIG. 2.

In some embodiments, as the rotor mechanism 127 rotates the rollers 118 through each cycle, the leading roller 119 eventually rotates around and past the end portion of the tube 124 that is coiled or positioned about the rotor mechanism 127, temporarily separating partially or entirely from the tube 124, as shown in FIGS. 12 and 12A. As this happens, the pressure in the tube 124 downstream from the pump 18 can suddenly and momentarily drop or even reverse, causing the flow of liquid out of the discharge assembly 20 to suddenly and momentarily stop, slow considerably, or reverse, even potentially drawing a small amount of fluid backward. The leading roller 119 then quickly becomes the trailing roller 119 as it reengages with the opposite or beginning end of the portion of the tube 124 that is coiled or positioned about the rotor mechanism 127, and the next roller 119 behind this one becomes the new leading roller 119. As the new leading roller 119 continues to rotate, engaging further with the tube 124, the forward pressure within the tube 124 rapidly increases once again, forcing fluid out of the discharge assembly 20 until the new leading roller 119 also rotates past the end portion of the tube 124 that is coiled or positioned about the rotor mechanism. At this point, the new leading roller 119 once again temporarily separates partially or entirely from the tube 124, once again suddenly and momentarily producing a stopping, slowing, or even reversal of the fluid flow through the tube 124. This cycle occurs repeatedly as each roller 119 moves around the engaged portion of the tube 124. Thus, in some embodiments, a rapidly advancing peristaltic pump can produce a somewhat uneven, discontinuous, and/or cyclically interrupted or periodically reversed flow of fluid.

Figure 12B:
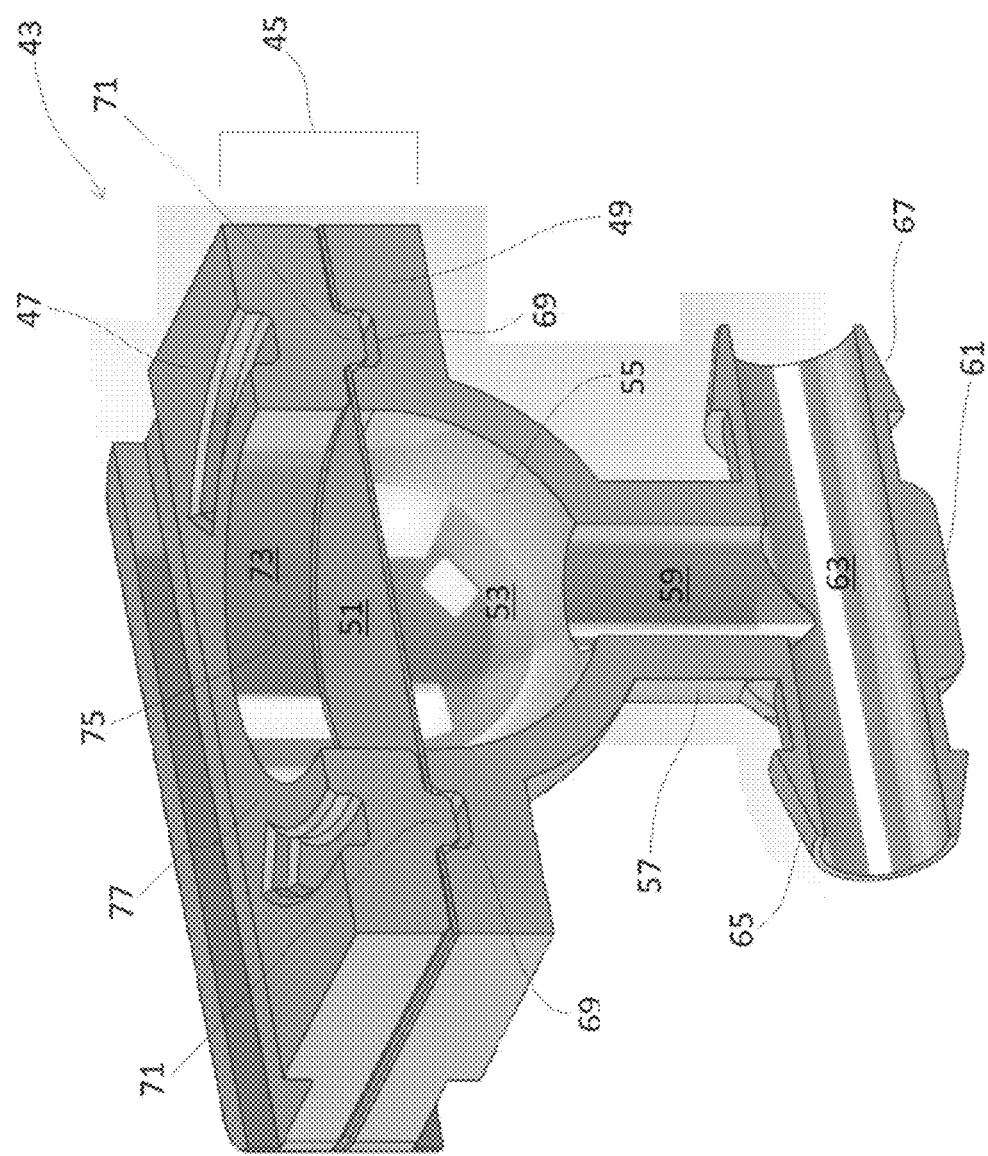
FIG. 12B illustrates an example of a fluid flow damper as shown in FIG. 12A.

As shown in FIG. 12A, one or more dampers 43 positioned within the pumping system, such as in the locations shown, can help to diminish, mitigate, lessen, and/or improve one or more of these consequences of peristaltic pumping or any other pumping embodiment that produces similar challenges. An example of a damper 43 is illustrated in FIG. 12B. The damper 43 can include a damper housing 45, which can comprise a first housing part 47 and a second housing part 49. The housing 45 can include a flow tube 61 with an inner flow channel 63. The flow tube 61 can include an inlet end 65 and an outlet end 67 configured to be attached in fluid communication with the tube 124 in one or more regions that are upstream and/or downstream from the pump 18, 118. The housing 45 can also include a damping chamber 53 and a side tube 57 with an inner flow channel 59, the side tube 57 providing fluid communication between the damping chamber 53 and the flow tube 61. A movable damping core, such as a thin, wide, flat damping membrane 51, as shown, can be positioned within or coupled to the housing 45 as shown in FIG. 12B.

In some embodiments, as illustrated, the damping membrane 51 is securely and fixedly held on one or more sides or entirely or substantially around its complete perimeter or circumference by tightly coupling the first and second housing parts 47, 49 around the edge or edges of the damping membrane 51. One or more mating portions, such as corresponding protrusions and/or recesses 69, 71 can help the first and second housing parts 47, 49 to couple together. The damping membrane 51 can be positioned or recessed below or within, or spaced from, an outer surface 77 of the housing 45 by a gap 73, such as may be formed by a curb, rim, or spacer with a perimeter wall 75.

In use, when the damper 43 is attached to the liquid dispenser, the pump 18, 118 drives liquid through the tube 124, which moves rapidly through the inner flow channel 63 of the damper 43, from the inlet end 65 to the outlet end 67.

As the rotating rollers 119, or any other pumping structure or action, produce interruptions in fluid flow (e.g., temporary decreases in pressure, temporary fluid stoppage, and/or temporary fluid flow reversal), the damper 43 can continuously, instantaneously, and/or automatically move to mitigate or diminish one or more of these effects. In response to changes in liquid pressure within the tube 124, a portion of the liquid passing through the inner flow channel 63 of the flow tube 61 may rise up into or recede from the inner flow channel 59 of the side tube 57, causing a fluid (e.g., air or liquid) entrapped within the damping chamber 53 and/or the inner flow channel 59 of the side tube 57 to compress, expand, or otherwise move in response to changes in the pressure of the fluid within the inner flow channel 63. Alternatively or in addition, the damping core or membrane 51 can stretch, bend, flex, or otherwise move to expand or contract the volume of the damping chamber 53 as needed. The gap 73 provides a region within which the damping core or membrane 51 can move without interfering with or contacting other components of the liquid dispenser. The damper 43 can help to substantially or generally equalize fluid pressure within the fluid pathway and/or to provide a substantially or generally even, continuous, smooth, and/or uninterrupted flow of fluid during pumping.

The ECU of the dispenser 100 can control the rotation of the rotor mechanism 127 and/or the rollers 119. In some variants, the ECU may include programming that each full rotation of the rotor mechanism 127 dispenses N units of liquid, the ECU can determine or receive a desired volume of liquid to be dispensed, and the ECU can control the rotation of the rotor mechanism 127 to dispense a determined or desired amount of liquid. For example, in some embodiments, the ECU includes programming that a full rotation of the rotor mechanism 127 dispenses about 3 cc of liquid, the ECU can determine or receive the desired volume of liquid to be dispensed is 2 cc, and the ECU can control the rotation of the rotor mechanism 127 to rotate ⅔ of a full rotation.

Some embodiments of the dispenser 100 are configured to facilitate quick priming. In certain situations, air may migrate or be pulled into the passage 129, such as when the dispenser 100 has not had liquid added to the reservoir 116 for the first time. It is typically desirable to evacuate the air from the passageway 129, such as by driving the air out the nozzle 128. Some embodiments of the dispenser 100 are configured to facilitate this process. This can enhance the accuracy, efficiency, and/or speed of dispensing liquid from the dispenser 100.

In some embodiments, the dispenser 100 reduces priming time by automatically filling a portion of the tube 124 with liquid. For example, as shown in FIG. 8, a portion of the tube 124 extends into the reservoir 116. When liquid is added into the reservoir 116, some of the liquid automatically flows into the tube 124. This can result a reduction in the distance that the liquid needs to travel to reach the pump 118, and/or in the volume of the tube 124 that contains air rather than liquid. A delay can occur between the time liquid is requested by the user and the time that liquid is dispensed by the dispenser 100. Some embodiments can advantageously reduce such the delay since the tube 124 may already be primed with liquid. Thus, when liquid is requested by a user, the rotor mechanism 127 and/or the rollers 119 can begin to rotate, causing liquid to be dispensed with minimal delay. For example, the time from the pump 118 beginning to operate to liquid being dispensed from the nozzle 128 can be less than or equal to about: 50 ms, 100 ms, 0.25 s, 0.5 s, 1 s, or other times. In some variants, the pump 118 comprises a self-priming pump, which is a pump that is configured to use an air-liquid mixture to reach a fully-primed pumping condition. In some embodiments, the pump is configured to reach a primed state in a number of cycles, such as about: 1, 2, 3, 4, 5, or more. In certain implementations, a cycle comprises the rotor mechanism 127 rotating 360° about: 1 time, 2 times, 3 times, 4 times, or more. In some embodiments, a cycle comprises a period that is less than or equal to about: 0.5 s, 0.75 s, 1.0 s, 1.25 s, 1.5 s, 2 s, or other times. To reach a primed state, some variants take less than or equal to about: 1 s, 1.5 s, 2 s, 2.5 s, 3 s, or other times. Some variants prime in about 2 cycles with each cycle lasting about 1 second. In some implementations, a cycle is triggered by an input, such as the sensor 132 detecting an object and/or the user input device 152 being actuated.

Another situation in which air may enter the tube 124 is when an insufficient amount of liquid is positioned within the reservoir 116 (e.g., the top of the liquid is about equal to or below the opening into the tube 124). When this occurs and the pump 118 is operated, air can be pulled into the tube 124. When additional liquid is then added into the reservoir 116, the air in the tube 124 may be trapped and need to be evacuated by a priming operation. In some embodiments, the pump 118 can cause a suction-like effect that causes the newly-added liquid to be drawn into and/or suctioned into at least a portion of the tube 124. For example, in some embodiments, newly-added liquid can enter at least a portion of the tube 124 automatically as new liquid is added to the reservoir 116. In some configurations, the liquid may enter into the tube 124 and travel along at least a portion of the tube 124 without rotation of the rotor mechanism and/or the rollers 119. For example, the liquid can travel along the tube 124 and enter the pump 118. In some examples, the liquid travels along the tube 124 to a point just before the inlet of the pump 118. In some examples, the liquid travels along the tube 124 to a portion adjacent the inlet of the tube 124.

In some embodiments, the dispenser 100 is configured such that the pump 118 is able to be primed from a fully empty state to primed state in less than 5 seconds. The term "fully empty state" can indicate that the tube 124 contains no or substantially no liquid. The term "primed state" can indicate that the tube 124 contains no or substantially no air. In some embodiments, the dispenser 100 is configured such that the pump 118 is able to be primed from a fully empty state to fully primed state in less than or equal to about: 1 s, 2 s, 5 s, 10 s, 15 s, 20 s, or other times.

Figure 13:
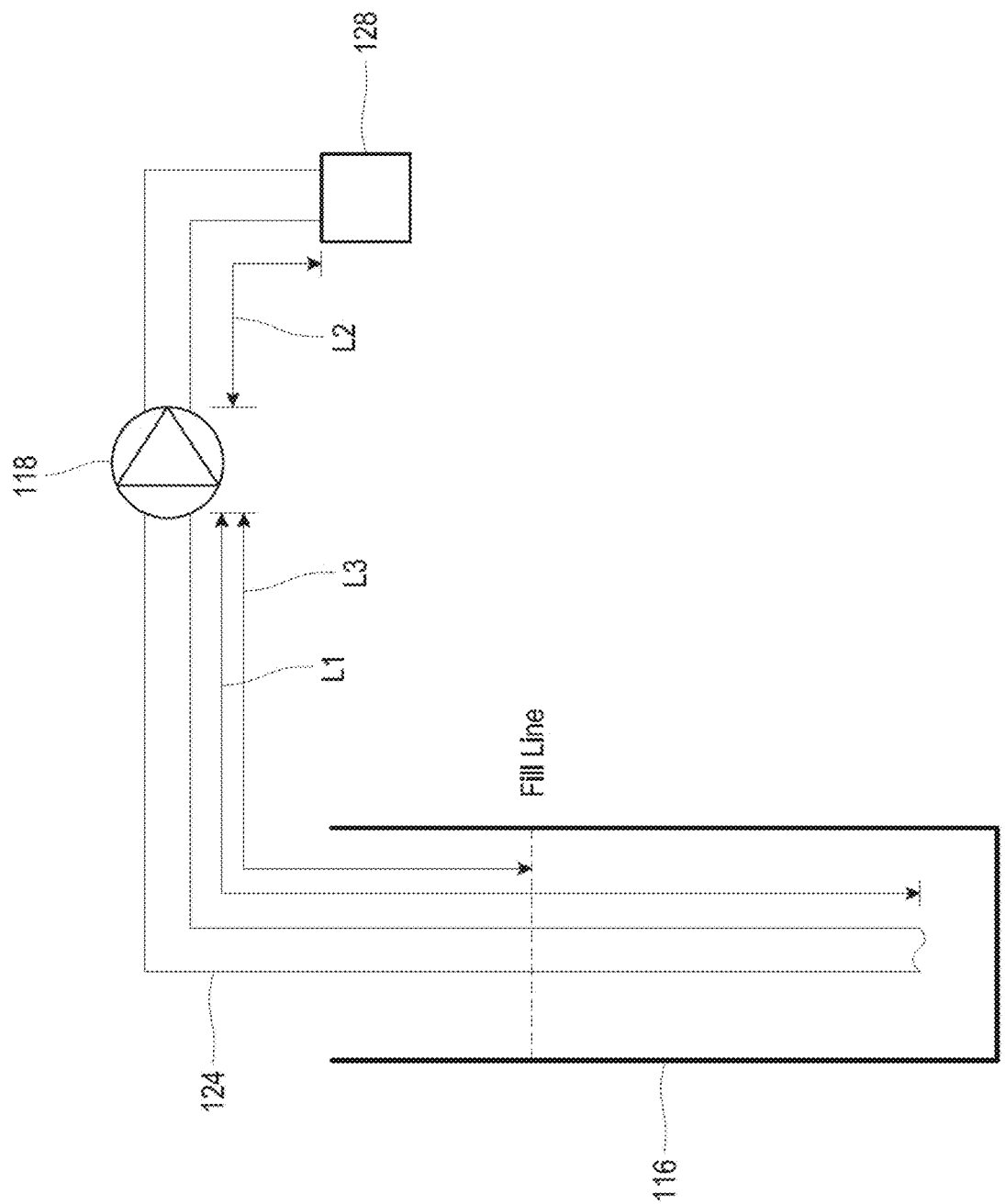
FIG. 13 schematically illustrates a portion of the liquid dispenser of FIG. 2.

The pump 118 can be positioned along at least a portion of the passageway 129. In some embodiments, a length and/or volume of the passageway 129 that is downstream of the pump 118 can be less than a length and/or volume of the passageway that is upstream of the pump 118. In some embodiments, when the reservoir 116 is substantially full of liquid (e.g., at least about 90% filled), the volume in the passageway downstream of the pump 118 is less than the volume in the passageway upstream of the pump 118. As shown in FIG. 13, for example, the passageway 129 extends from an entry opening of the tube 124 to the nozzle 128. When liquid is poured into the reservoir 116, at least some of the liquid automatically enters and/or is pulled into the tube 124 from the reservoir 116. This can reduce the length that liquid needs to travel through the passageway 129 when a request is received by the dispenser 100 to dispense liquid. In some implementations, as shown in FIG. 13, the passageway 129 extends from the opening of the tube 124 to the pump 118 for a length L1. Some embodiments have a fill line (e.g., the point at which the reservoir 116 is at least about 90% full of liquid). The passageway 129 can extend from the fill line to the pump 118 for a length L3. As illustrated, L3 is less than L1. This occurs because the liquid is automatically pulled into the tube 124 upon filling the reservoir 116. As discussed elsewhere in this disclosure, the compression force applied by the pump 118 on a portion of the tube 124 that passes through the pump 118 can help to maintain the liquid level in the tube 124. In various embodiments, the liquid does not travel the entire length L1 when liquid is requested to be dispensed from the dispenser 100. Instead, the liquid can travel beginning at a point spaced away from the opening of the tube 124, within the fluid passageway.

In some embodiments, the fluid passageway extends through one end of the pump to another end of the pump. After passing through the pump, the fluid passageway can extend from an end of the pump to the nozzle 128 (e.g., the location where liquid will be dispensed from and/or exit the fluid passageway) for a length L2. In some embodiments, as discussed in more detail below, the pump 118 can be positioned closer to the nozzle 128 than to the bottom of the dispenser 100. This can allow the portion of the fluid passageway extending between the pump 118 and the nozzle 128 to be shorter than the distance between the opening of the tube 124 and the pump 118. For example, as shown in FIG. 13, the length L2 can be shorter than the length L1. In some embodiments, this enables the liquid to travel a shorter distance when liquid is requested to be dispensed. In some embodiments, L2 can be shorter than L3. In some embodiments, L3 represents a length from the fill line to the pump 118. In some embodiments, L3 represents a length from the level of the liquid within the tube 124 when the dispenser is in a resting state. Since the pump 118 enables the liquid to be positioned at least partially within the fluid passageway when the dispenser 100 is in the resting state, the liquid can travel a shorter length through the fluid passageway to reach the nozzle. This can decrease the amount of time between when the dispenser 100 receives a request to dispense liquid and when the dispenser 100 dispenses liquid from the nozzle 128. In some embodiments, L2 can be shorter than L1. In some embodiments, L2 can be shorter than L3. In some embodiments in which the liquid level is near or at the fill line, L2 can be shorter than L3. In some embodiments in which the liquid level is near or at the fill line, L2 can be longer than L3, but shorter than L1.

As shown in FIG. 8, the pump 118 is positioned close to the nozzle 128. This can reduce the distance that liquid needs to travel from the pump 118 to the nozzle 128 compared, for example, to having the pump 118 positioned far from the nozzle 128, such as having the nozzle 128 positioned near a top of the dispenser and the pump 118 positioned near a bottom of the dispenser. In some implementations, the lateral distance from the pump 118 to the nozzle 128 is less than or equal to the vertical distance from the pump 118 to the bottom of the dispenser 100. In certain variants, the lateral distance from the pump 118 to the nozzle 128 is less than or equal to the diameter of the dispenser 100. In some embodiments, the pump 118 is positioned above the reservoir 116. In certain implementations, the pump 118 can be positioned approximately in the same plane (e.g., a plane parallel to the surface on which the dispenser rests) as the nozzle 128. In some embodiments, the pump 118 is positioned at least partially below the nozzle 128. In certain variants, the pump 118 is positioned at least partially above the nozzle 128. In some implementations, the pump 118 is positioned in an upper ½ of the dispenser, an upper ⅓ of the dispenser, and/or an upper ¼ of the dispenser 100. In some embodiments, the pump 118 is positioned near a mid-section of the dispenser 100. In some embodiments, the pump 118 is positioned near the plane of the nozzle 128. Thus, the pump 118 can be positioned closer to the top of the dispenser 100 than the bottom of the dispenser 100. In some embodiments, the pump 118 can require less space within the dispenser 100. Such configurations can allow the dispenser 100 to be smaller.

In some embodiments, the location of the pump 118 can facilitate efficient operation of the dispenser 100. For example, in certain embodiments with the pump 118 disposed closer to the top of the dispenser than to the bottom of the dispenser, the pump 118 can reduce the amount of power needed to pump fluid through the tube 124 (compared to, for example, the pump being positioned closer to the bottom of the dispenser than to the top of the dispenser). For example, less power may be required to pump liquid from the reservoir 116 to the nozzle 128 since the pump 118 can be positioned closer to the nozzle 128 than to the bottom of the reservoir 116. Thus, the liquid can travel a shorter overall route and/or a shorter length of the tube 124 may need to be primed before dispensing liquid.

The pump 118 may require less time to prime the tube 124 in use. The pump 118 can create a suction-like environment in which at least some liquid is pulled into the tube 124 from the reservoir 116 in a resting state. When the pump 118 is in a resting state, liquid can remain within the tube 124 since the rollers maintain engagement with the tube 124 and compress at least a portion of the tube 124. Thus, the pump 118 may more efficiently prime the tube 124 and/or require less power to prime the tube 124 before dispensing liquid through the nozzle 128.

Certain examples of the pump 118 described herein can lengthen the life of the power supply 160. For example, less power may be required by the pump 118 to dispense liquid. Thus, the power supply 160 can be used to dispense a greater volume of liquid. In some configurations, the user can request liquid to be dispensed a greater number of times before the power supply 160 is replaced and/or recharged. In some embodiments, a smaller power supply 160 (e.g., in power storage amount) may be used.

Certain Terminology

Terms of orientation used herein, such as "top," "bottom," "horizontal," "vertical," "longitudinal," "lateral," and "end" are used in the context of the illustrated embodiments. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular" or "cylindrical" or "semi-circular" or "semi-cylindrical" or any related or similar terms, are not required to conform strictly to the mathematical definitions of circles or cylinders or other structures, but can encompass structures that are reasonably close approximations.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may permit, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may permit, the term "generally parallel" can refer to something that departs from exactly parallel by less than or equal to 20 degrees. As another example, in certain embodiments, as the context may permit, the term "generally perpendicular" can refer to something that departs from exactly perpendicular by less than or equal to 20 degrees.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

SUMMARY

Although the liquid dispenser has been disclosed in the context of certain embodiments and examples, it will be understood by those skilled in the art that the liquid dispenser extends beyond the specifically disclosed embodiments to other alternative embodiments and/or uses of the embodiments and certain modifications and equivalents thereof. For example, some embodiments can be configured to use a fluid other than liquid, e.g., hand sanitizer, shampoo, hair conditioner, skin moisturizer or other lotions, toothpaste, or other fluids. It should be understood that various features and aspects of the disclosed embodiments can be combined with or substituted for one another in order to form varying modes of the liquid dispenser. Accordingly, it is intended that the scope of the liquid dispenser herein-disclosed should not be limited by the particular disclosed embodiments described herein, but should be determined only by a fair reading of the claims that follow.

The following is claimed:

1. A portable liquid dispenser configured for consumer use in dispensing soap, sanitizer, or ingestible liquids, comprising:
   a housing;
   a reservoir configured to store a liquid;
   a fluid pathway included at least in part in a flexible tube disposed in the housing, wherein the flexible tube has an inlet and an outlet;
   a pump disposed in the housing, wherein the pump comprises:
      a rotor including a plurality of rollers,
      wherein the rotor has a rotor rotational axis,
      wherein each of the plurality of rollers has a roller rotational axis, and
      wherein the plurality of rollers is configured to rotate about the rotor rotational axis and the roller rotational axis;
   a motor disposed in the housing, wherein the motor is configured to drive the pump configured to cause the liquid to move through the flexible tube;
   a fluid flow damper in fluid communication with the fluid pathway and the pump;
   a sensor configured to generate an electrical signal; and
   an electronic processor configured to receive the signal from the sensor to control the motor to dispense the liquid;
   wherein:
      the damper comprises a first passage in fluid communication with the fluid pathway, a damper chamber in fluid communication with the first passage, and a flat damping membrane positioned in the damper chamber; and
      the damper membrane is planar;
      the damper is configured to deflect into a space when a pressure in the damper chamber exceeds a pressure in the space.

2. The liquid dispenser of claim 1, further comprising a second damper.

3. The liquid dispenser of claim 1, further comprising a nozzle configured to allow the liquid to be dispensed.

4. The liquid dispenser of claim 3, wherein the damper is positioned in a fluid pathway between the pump and the nozzle.

5. The liquid dispenser of claim 1, wherein the damper is positioned in a fluid pathway between the reservoir and the pump.

6. The liquid dispenser of claim 1, wherein the damper comprises a membrane.

7. The liquid dispenser of claim 1, wherein the damper comprises entrapped air.

8. The liquid dispenser of claim 1, wherein the damper helps to produce a substantially even flow of liquid.

9. The liquid dispenser of claim 1, wherein the damper helps to produce an uninterrupted flow of liquid.

10. The liquid dispenser of claim 1, wherein
    the pump comprises a rotation-tracking feedback system in electrical communication with the electronic processor.

11. The liquid dispenser of claim 10, wherein the rotation-tracking feedback system comprises a magnetic sensor that produces an electrical signal.

12. The liquid dispenser of claim 11, wherein the magnetic sensor is configured to measure a magnetic field emitted by a magnet on at least one of the rollers.

13. The liquid dispenser of claim 11, wherein the electronic control unit is configured to use the electrical signal from the magnetic sensor to measure the amount of rotation of the rollers.

14. The liquid dispenser of claim 13, wherein the electronic control unit is configured to use the amount of rotation of the rollers to estimate the volume of liquid dispensed.

15. The liquid dispenser of claim 14, wherein the electronic control unit is configured to use the volume of liquid dispensed to control the operation of the pump.

16. The liquid dispenser of claim 1, wherein the damper comprises only one passage in communication with the fluid pathway.

* * * * *